US012810776B2

(12) United States Patent
Hwang et al.

(10) Patent No.: US 12,810,776 B2
(45) Date of Patent: Nov. 24, 2026

(54) DISPLAY DEVICE AND DISPLAY PANEL

(71) Applicant: LG Display Co., Ltd., Seoul (KR)

(72) Inventors: Seonghwan Hwang, Paju-si (KR); ByeongUk Gang, Paju-si (KR); Jooyoung Pyo, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/022,766

(22) Filed: Jan. 15, 2025

(65) Prior Publication Data

US 2025/0239214 A1 Jul. 24, 2025

(30) Foreign Application Priority Data

Jan. 18, 2024 (KR) ........................ 10-2024-0007763

(51) Int. Cl.
*G09G 3/32* (2016.01)
*G09G 3/3233* (2016.01)

(52) U.S. Cl.
CPC ............ *G09G 3/32* (2013.01); *G09G 3/3233* (2013.01); *G09G 2300/0465* (2013.01); *G09G 2330/021* (2013.01); *G09G 2330/10* (2013.01)

(58) Field of Classification Search
CPC ... G09G 2300/0426; G09G 2300/0465; G09G 2330/021; G09G 2330/08; G09G 2330/10; G09G 3/32–3291; G09G 2300/042; H10K 59/131; H10K 71/861; H10K 59/12–129; G09F 9/33; G09F 9/335
See application file for complete search history.

(56) References Cited

U.S. PATENT DOCUMENTS

| | | | | |
|---|---|---|---|---|
| 9,129,923 B1 | 9/2015 | Han et al. | | |
| 2015/0161943 A1* | 6/2015 | Shim | G09G 3/3225 345/76 |
| 2019/0206300 A1 | 7/2019 | Lee et al. | |
| 2021/0098551 A1* | 4/2021 | Lee | H10K 59/121 |
| 2021/0098749 A1* | 4/2021 | Choi | H10D 86/441 |
| 2021/0134891 A1* | 5/2021 | Lee | H10K 59/122 |
| 2022/0123092 A1* | 4/2022 | Park | G02F 1/1309 |
| 2022/0208925 A1 | 6/2022 | Park et al. | |

FOREIGN PATENT DOCUMENTS

| | | |
|---|---|---|
| EP | 2 787 499 A1 | 10/2014 |
| EP | 4 207 991 A1 | 7/2023 |
| JP | 2020-532754 A | 11/2020 |
| KR | 10-2123979 B1 | 6/2020 |
| KR | 10-2023-0078022 A | 6/2023 |

* cited by examiner

*Primary Examiner* — Amr A Awad
*Assistant Examiner* — Aaron Midkiff
(74) *Attorney, Agent, or Firm* — Birch, Stewart, Kolasch & Birch, LLP

(57) ABSTRACT

A display device according to embodiments of the present disclosure may include a first lower metal directly connected to a first pixel electrode or a first source electrode in a first subpixel and overlapping with a first active layer, a second lower metal directly connected to a second pixel electrode or a second source electrode in a second subpixel and overlapping with a second active layer, and an overlapping pattern in which one side overlaps with at least a portion of the first lower metal and another side overlaps with at least a portion of the second lower metal.

20 Claims, 28 Drawing Sheets

DISPLAY DEVICE AND DISPLAY PANEL

CROSS-REFERENCE TO RELATED APPLICATION

This application claims priority to Korean Patent Application No. 10-2024-0007763, filed in the Republic of Korea on Jan. 18, 2024, the entire contents of which is hereby expressly incorporated by reference into the present application.

BACKGROUND

Field

Embodiments of the present disclosure relate to a display device and a display panel.

Discussion of the Related Art

In manufacturing a display panel, defects such as bright spots or dark spots in the subpixel can occur due to various reasons, such as foreign matter occurring at various locations within the subpixel. For example, a driving transistor within each subpixel is formed through a lot of processes, and minute process-related foreign matters can be introduced in the driving transistor. If such foreign matters are generated in the driving transistor, there can occur a short circuit or an open phenomenon due to the foreign matters. Due to this phenomenon, the corresponding subpixel can become a defective subpixel which does not emit light normally. As a result, there can decrease the yield of the display panel.

SUMMARY OF THE DISCLOSURE

Embodiments of the present disclosure can provide a display device and a display panel having a repair structure capable of repairing a subpixel with a defect.

Embodiments of the present disclosure can provide a display device and a display panel having a repair structure with high repair performance or high possibility of repair success.

Embodiments of the present disclosure can provide a display device and a display panel having a repair structure which does not cause a decrease in aperture ratio.

Embodiments of the present disclosure can provide a display device and a display panel having a repair structure occupying a small space.

Embodiments of the present disclosure can provide a display device and a display panel having a repair structure suitable for high-resolution implementation.

A display device according to embodiments of the present disclosure can include a first driving transistor including a first active layer, a first drain electrode, and a first gate electrode, a first pixel electrode connected directly to a portion of the first active layer or electrically connected to a portion of the first active layer through an additional first source electrode, a second driving transistor including a second active layer, a second drain electrode, and a second gate electrode, a second pixel electrode connected directly to a portion of the second active layer or electrically connected to a portion of the second active layer through an additional second source electrode, a first lower metal directly connected to the first pixel electrode or directly connected to the first source electrode and overlapping with the first active layer, a second lower metal directly connected to the second pixel electrode or directly connected to the second source electrode and overlapping with the second active layer, a first buffer layer disposed on the first lower metal and the second lower metal, an overlapping pattern disposed on the first buffer layer and including a first part overlapping with at least a portion of the first lower metal, a second part overlapping with at least a portion of the second lower metal, and a third part between the first part and the second part, and a second buffer layer disposed on the overlapping pattern and disposed below the first active layer and the second active layer.

A display panel according to embodiments of the present disclosure can include a first subpixel including a first subpixel circuit and a first light emitting device, a second subpixel including a second subpixel circuit and a second light emitting device, a first lower metal connected to the first subpixel circuit, a second lower metal connected to the second subpixel circuit, an overlapping pattern including a first part overlapping with a part of the first lower metal, a second part overlapping with a part of the second lower metal, and a third part between the first part and the second part, and a first buffer layer disposed between the first lower metal, the second lower metal, and the overlapping pattern.

According to embodiments of the present disclosure, it is possible to provide a display device and a display panel having a repair structure capable of repairing a subpixel with a defect.

According to embodiments of the present disclosure, it is possible to provide a display device and a display panel having a repair structure which does not cause a decrease in aperture ratio.

According to embodiments of the present disclosure, it is possible to provide a display device and a display panel having a repair structure occupying a small space.

According to embodiments of the present disclosure, it is possible to a display device and a display panel having a repair structure suitable for high-resolution implementation.

According to embodiments of the present disclosure, it is possible to provide a display device and a display panel having a repair structure with high repair performance or high possibility of repair success, thereby optimizing the process by reducing production energy consumption.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
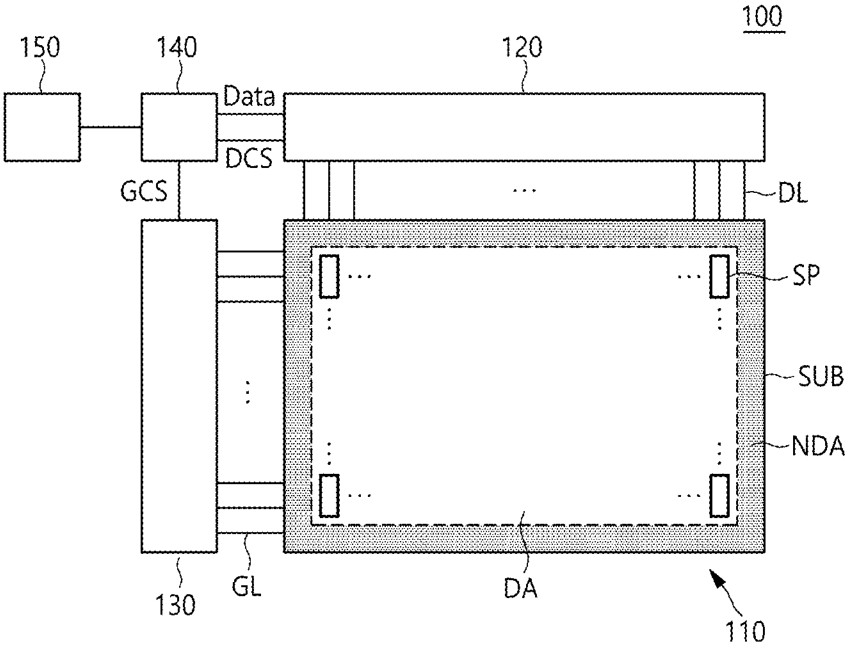
FIG. 1 is a system configuration diagram of a display device according to embodiments of the present disclosure.

Hereinafter, embodiments of the disclosure are described in detail with reference to the accompanying drawings. In assigning reference numerals to components of each drawing, the same components can be assigned the same numerals even when they are shown on different drawings. When determined to make the subject matter of the disclosure unclear, the detailed of the known art or functions can be skipped. As used herein, when a component "includes," "has," or "is composed of" another component, the component can add other components unless the component "only" includes, has, or is composed of" the other component. As used herein, the singular forms "a", "an" and "the" are intended to include the plural forms as well, unless the context clearly indicates otherwise.

Such denotations as "first," "second," "A," "B," "(a)," and "(b)," can be used in describing the components of the disclosure. These denotations are provided merely to distinguish a component from another, and the essence, order, or number of the components are not limited by the denotations.

In describing the positional relationship between components, when two or more components are described as "connected", "coupled" or "linked", the two or more components can be directly "connected", "coupled" or "linked"", or another component can intervene. Here, the other component can be included in one or more of the two or more components that are "connected", "coupled" or "linked" to each other.

When such terms as, e.g., "after", "next to", "after", and "before", are used to describe the temporal flow relationship related to components, operation methods, and fabricating methods, it can include a non-continuous relationship unless the term "immediately" or "directly" is used.

When a component is designated with a value or its corresponding information (e.g., level), the value or the corresponding information can be interpreted as including a tolerance that can arise due to various factors (e.g., process factors, internal or external impacts, or noise). The term "can" fully encompasses all the meanings and coverages of the term "may."

Hereinafter, various embodiments of the disclosure are described in detail with reference to the accompanying drawings. All the components of each display device and panel according to all embodiments of the present disclosure are operatively coupled and configured.

FIG. 1 is a system configuration diagram of a display device 100 according to embodiments of the present disclosure.

Referring to FIG. 1, the display device 100 according to embodiments of the present disclosure can include a display panel 110 including a plurality of subpixels SP, and a driving circuit for driving the plurality of subpixels SP included in the display panel 110.

The driving circuit can include a data driving circuit 120 and a gate driving circuit 130, and can further include and a controller 140 for controlling the data driving circuit 120 and the gate driving circuit 130.

The display panel 110 can include a substrate SUB and signal lines such as a plurality of data lines DL and a plurality of gate lines GL disposed on the substrate SUB. A plurality of data lines DL and a plurality of gate lines GL can be connected to a plurality of subpixels SP.

The display panel 110 can include a display area DA where an image is displayed and a non-display area NDA where an image is not displayed. In the display panel 110, a plurality of subpixels SP for displaying an image can be disposed in the display area DA, and driving circuits 120, 130 and 140 can be electrically connected to the non-display area NDA, or can be mounted on the non-display area NDA. Alternatively, there can be disposed a pad portion to which an integrated circuit or printed circuit are connected in the non-display area NDA.

The data driving circuit 120 can be a circuit for driving a plurality of data lines DL, and can supply data signals to the plurality of data lines DL.

The gate driving circuit 130 can be a circuit for driving a plurality of gate lines GL, and can supply gate signals to the plurality of gate lines GL.

The controller 140 can supply a data driving control signal DCS to the data driving circuit 120 to control the data driving circuit 120, and can supply a gate driving control signal GCS to the gate driving circuit 130 to control the gate driving circuit 130.

The controller 140 can start scanning according to the timing implemented in each frame, and convert the input image data input from the outside to fit the data signal format used in the data driving circuit 120 to obtain the converted image data and supply the converted image data to the data driving circuit 120, and can control data drive at an appropriate time according to the scan.

The controller 140 can receive various timing signals such as a vertical synchronization signal VSYNC, a horizontal synchronization signal HSYNC, an input data enable signal DE, a clock signal CLK along with input image data from the outside (e.g., the host system 150).

In order to control the data driving circuit 120 and the gate driving circuit 130, the controller 140 can receive various timing signals such as a vertical synchronization signal VSYNC, a horizontal synchronization signal HSYNC, an input data enable signal DE, a clock signal CLK, and can generate various control signals DCS and GCS and output to the data driving circuit 120 and the gate driving circuit 130.

For example, the controller 140 can output various gate control signals GCS including a gate start pulse GSP, a gate shift clock GSC, and a gate output enable GOE signals to control the gate driving circuit 130.

In addition, in order to control the data driving circuit 120, the controller 140 can output various data control signals DCS including a source start pulse SSP, a source sampling clock SSC, and a source output enable SOE signals.

The controller 140 can be implemented as a separate component from the data driving circuit 120, or can be integrated with the data driving circuit 120 and implemented as an integrated circuit.

The data driving circuit 120 can receive image data Data from the controller 140 and supply a data voltage to the plurality of data lines DL, thereby driving the plurality of data lines DL. Here, the data driving circuit 120 can be also referred to as a source driving circuit.

The data driving circuit 120 can include one or more source driver integrated circuits SD1C.

Each source driver integrated circuit SD1C can include a shift register, a latch circuit, a digital to analog converter DAC, an output buffer. In some cases, each source driver integrated circuit SD1C can further include an analog to digital converter ADC.

For example, each source driver integrated circuit SD1C can be connected to the display panel 110 using a tape automated bonding (TAB) method, or can be connected to the bonding pad of the display panel 110 using a chip-on-glass (COG) or chip-on-panel (COP) method, or can be implemented using a chip-on-film (COF) method and connected to the display panel 110.

The gate driving circuit 130 can output a gate signal of a turn-on level voltage or a gate signal of a turn-off level voltage according to the control of the controller 140. The gate driving circuit 130 can sequentially drive a plurality of gate lines GL by sequentially supplying a gate signal with a turn-on level voltage to the plurality of gate lines GL.

The gate driving circuit 130 can be connected to the display panel 110 using a tape automated bonding (TAB) method, or can be connected to a bonding pad of the display panel 110 using a chip-on-glass (COG) or chip-on-panel (COP) method, or can be connected to the display panel 110 according to a chip-on-film (COF) method. Alternatively, the gate driving circuit 130 can be a gate-in-panel (GIP) type, and can be formed in the non-display area NDA of the display panel 110. The gate driving circuit 130 can be disposed on or connected to the substrate SUB. For example, if the gate driving circuit 130 is of the GIP type, it can be disposed in the non-display area NDA of the substrate SUB. The gate driving circuit 130 can be connected to the substrate SUB in the case of a chip-on-glass (COG) type, chip-on-film (COF) type, etc.

Meanwhile, at least one of the data driving circuit 120 and the gate driving circuit 130 can be disposed in the display area DA. For example, at least one of the data driving circuit 120 and the gate driving circuit 130 can be disposed not to overlap with the subpixels SP, or can be disposed to partially or entirely overlap with the subpixels SP.

When a specific gate line GL is selected by the gate driving circuit 130, the data driving circuit 120 can convert the image data Data received from the controller 140 into an analog data voltage, and can supply the anlog data voltage to the plurality of data lines DL.

The data driving circuit 120 can be connected to one side (e.g., the upper or lower side) of the display panel 110. Depending on the driving method or panel design method, the data driving circuit 120 can be connected to both sides (e.g., upper and lower sides) of the display panel 110, or can be connected to two or more of the four sides of the display panel 110.

The gate driving circuit 130 can be connected to one side (e.g., left or right) of the display panel 110. Depending on the driving method or panel design method, the gate driving circuit 130 can be connected to both sides (e.g., left and right) of the display panel 110, or can be connected to two or more of the four sides of the display panel 110.

The controller 140 can be a timing controller used in typical display technology, or can be a control device capable of further performing other control functions including a timing controller, or can be a control device different from the timing controller, or can be a control device other than a timing controller, or can be a circuit within the control device. The controller 140 can be implemented with various circuits or electronic components, such as an integrated circuit (IC), a field programmable gate array (FPGA), an application specific integrated circuit (ASIC), or a processor.

The controller 140 can be mounted on a printed circuit board, a flexible printed circuit, etc., and can be electrically connected to the data driving circuit 120 and the gate driving circuit 130 through a printed circuit board, a flexible printed circuit.

The controller 140 can transmit and receive signals with the data driving circuit 120 according to one or more predetermined interfaces. For example, the interface can include a low voltage differential signaling (LVDS) interface, an embedded clock point-point interface (EPI) interface, or a serial peripheral interface (SP1).

The controller 140 can include a storage medium such as one or more registers.

The display device 100 according to the present embodiments can be a display including a backlight unit such as a liquid crystal display device, or can be a self-luminous display such as an organic light emitting display device, a quantum dot display device, and an inorganic light emitting display device.

If the display device 100 according to the present embodiments is an organic light emitting display device, each subpixel SP can include an organic light emitting diode (OLED) which emits light as a light emitting device.

If the display device 100 according to the present embodiments is a quantum dot display device, each subpixel SP can include a light emitting device made of quantum dots, which are semiconductor crystals emitting light on their own.

If the display device 100 according to the present embodiments is an inorganic light emitting display device, each subpixel SP can include an inorganic light-emitting device which emit light on its own and made based on an inorganic material as a light emitting device. For example, inorganic light emitting devices can be also referred to as a microscale or nanoscale light emitting diodes (LEDs), and inorganic light emitting displays can be also referred to as a micro-LED displays or nano-LED displays.

Figure 2:
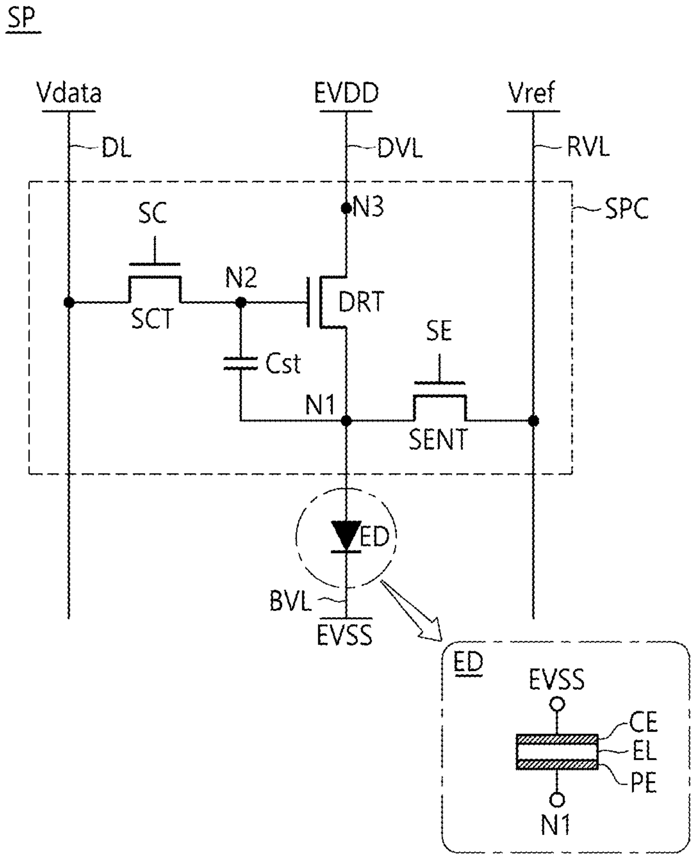
FIG. 2 is an equivalent circuit of a subpixel in a display panel according to embodiments of the present disclosure.

FIG. 2 is an equivalent circuit of a subpixel in a display panel 110 according to embodiments of the present disclosure.

Referring to FIG. 2, each of the plurality of subpixels SP disposed on the display panel 110 according to embodiments of the present disclosure can include a light emitting device ED and a subpixel circuit SPC for driving the light emitting device ED.

The subpixel circuit SPC of each subpixel SP can include a driving transistor DRT, a scan transistor SCT, a sensing transistor SENT, and a storage capacitor Cst. In this case, the subpixel circuit SPC of each subpixel SP can include three transistors (DRT, SCT, SENT) and one capacitor (Cst), so it can be referred to as a 3T-1C structure.

The light emitting device ED can include a pixel electrode PE, a common electrode CE, and an emission layer EL located between the pixel electrode PE and the common electrode CE.

The pixel electrode PE can be an electrode connected to a transistor such as the driving transistor DRT, and can be an electrode disposed in each subpixel SP. The common electrode CE can be an electrode to which a common voltage is applied, and is an electrode commonly disposed in all subpixels SP. For example, the common voltage can be a driving voltage EVDD, which is a high-level common voltage, or a base voltage EVSS, which is a low-level common voltage.

When the base voltage EVSS is applied to the common electrode CE, the common electrode CE can receive the base voltage EVSS through a base voltage line BVL.

According to the example of FIG. 2, the pixel electrode PE can be an anode electrode, and the common electrode CE can be a cathode electrode. Alternatively, the pixel electrode PE can be a cathode electrode, and the common electrode CE can be an anode electrode.

For example, the light emitting device ED can be an organic light emitting diode (OLED), an inorganic light emitting diode (LED), or a quantum dot light emitting device.

The driving transistor DRT is a transistor for driving the light emitting device ED, and can include a first node N1, a second node N2, and a third node N3.

The first node N1 of the driving transistor DRT can be a source node or a drain node of the driving transistor DRT, can be electrically connected to a source node or a drain node of the sensing transistor SENT, and can also be electrically connected to the pixel electrode PE of the light emitting device ED.

The second node N2 of the driving transistor DRT can be a gate node of the driving transistor DRT, and can be electrically connected to a source node or a drain node of the scan transistor SCT.

The third node N3 of the driving transistor DRT can be electrically connected to a driving voltage line DVL which supplies a driving voltage EVDD.

The scan transistor SCT can be controlled by the scan signal SC, which is a type of gate signal, and can be connected between the second node N2 of the driving transistor DRT and the data line DL. For example, the scan transistor SCT can be turned on or off depending on the scan signal SC supplied from a scan signal line SCL, which is a type of gate line GL, and can control the connection between the second nodes N2 of the driving transistor DRT and the data line DL.

The scan transistor SCT can be turned on by the scan signal SC having a turn-on level voltage, and can transfer a data voltage Vdata supplied from the data line DL to the second node N2 of the driving transistor DRT.

Here, if the scan transistor SCT is an n-type transistor, the turn-on level voltage of the scan signal SC can be a high level voltage. If the scan transistor SCT is a p-type transistor, the turn-on level voltage of the scan signal SC can be a low level voltage. Hereinafter, the scan transistor SCT is exemplified as an n-type transistor. Accordingly, the turn-on level voltage is exemplified as a high level voltage.

The sensing transistor SENT can be controlled by a sensing signal SE, which is a type of gate signal, and can be connected between the first node N1 of the driving transistor DRT and a reference voltage line RVL. For example, the sensing transistor SENT can be turned on or off according to the sensing signal SE supplied from the sensing signal line SENL, which is another type of gate line GL, and can control the connection between the reference voltage line RVL and the first node N1 of the driving transistor DRT.

The sensing transistor SENT can be turned on by the sensing signal SE having a turn-on level voltage, and can transfer a reference voltage Vref supplied from the reference voltage line RVL to the first node N1 of the driving transistor DRT. Here, the sensing signal SE can be considered as a second scan signal different from the scan signal SC.

In addition, the sensing transistor SENT can be turned on by the sensing signal SE having a turn-on level voltage, and can transfer the voltage of the first node N1 of the driving transistor DRT to the reference voltage line RVL.

Here, if the sensing transistor SENT is an n-type transistor, the turn-on level voltage of the sensing signal SE can be a high level voltage. If the sensing transistor SENT is a p-type transistor, the turn-on level voltage of the sensing signal SE can be a low level voltage. Hereinafter, there is exemplified that the sensing transistor SENT is an n-type transistor. Accordingly, the turn-on level voltage is exemplified as a high level voltage.

The function of the sensing transistor SENT to transfer the voltage of the first node N1 of the driving transistor DRT to the reference voltage line RVL can be used when driving to sense the characteristic value of the subpixel SP. In this case, the voltage transmitted to the reference voltage line RVL can be a voltage for calculating the characteristic value of the subpixel SP or a voltage reflecting the characteristic value of the subpixel SP.

In the present disclosure, the characteristic value of the subpixel SP can be the characteristic value of the driving transistor DRT or the light emitting device ED. For example, the characteristic values of the driving transistor DRT can include a threshold voltage and a mobility of the driving transistor DRT. The characteristic value of the light emitting device ED can include a threshold voltage of the light emitting device ED.

The storage capacitor Cst can be connected between the second node N2 and the first node N1 of the driving transistor DRT. The storage capacitor Cst can be charged with a charge corresponding to the voltage difference between the two ends, and can function to maintain the voltage difference between the two ends for a set frame time. Accordingly, the corresponding subpixel SP can emit light during a set frame time.

In this specification, a source node, a drain node, and a gate node of various transistors DRT, SCT and SENT can be also referred to as a source electrode, a drain electrode, and a gate electrode.

The driving transistor DRT, the scan transistor SCT, and the sensing transistor SENT can each be an n-type transistor or a p-type transistor. In this disclosure, for convenience of explanation, there is exemplified that the driving transistor DRT, the scan transistor SCT, and the sensing transistor SENT are each n-type as an example.

The storage capacitor Cst can be an external capacitor intentionally designed outside the driving transistor DT rather than a parasitic capacitor (e.g., Cgs, Cgd) as an internal capacitor which can exist between the first node N1 and the second node N2 of the driving transistor DRT.

The subpixel SP shown in FIG. 2 is only an example, and can be modified in various ways by including one or more transistors or one or more capacitors.

For example, the gate node of the scan transistor SCT and the gate node of the sensing transistor SENT may not be connected. For example, the gate node of the scan transistor SCT and the gate node of the sensing transistor SENT can be connected to different gate lines GL.

In this case, the on-off of the scan transistor SCT and the on-off of the sensing transistor SENT can be controlled independently.

As another example, the gate node of the scan transistor SCT and the gate node of the sensing transistor SENT can be electrically connected to each other. For example, the gate node of the scan transistor SCT and the gate node of the sensing transistor SENT can be commonly connected to one gate line GL.

In this case, the on-off of the scan transistor SCT and the on-off of the sensing transistor SENT can be simultaneously controlled.

The display panel 110 according to embodiments of the present disclosure can have a top emission structure in which light emitted from the light emitting device ED is emitted in the opposite direction of the substrate SUB, or can have a bottom emission structure in which light emitted from the light emitting device ED is emitted in the direction of the substrate SUB. Hereinafter, for convenience of explanation, there is exemplified an example in which the display panel 110 according to embodiments of the present disclosure has a bottom emission structure.

Figure 3:
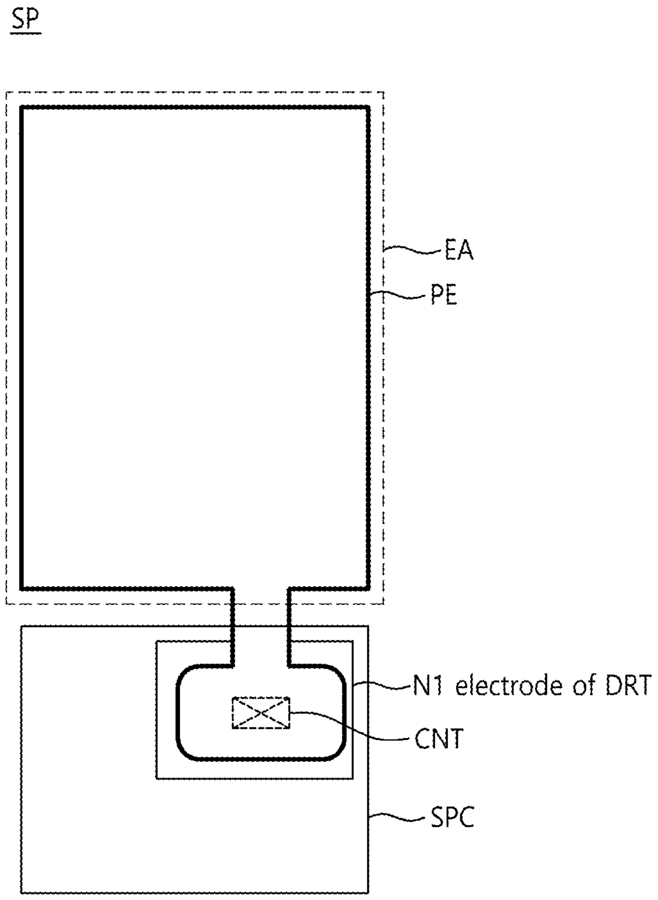
FIG. 3 is a schematic plan view of a subpixel of a display device according to embodiments of the present disclosure.

FIG. 3 is a schematic plan view of a subpixel SP of a display device 100 according to embodiments of the present disclosure.

Referring to FIG. 3, each subpixel SP can include an emission area EA and a subpixel circuit SPC. A pixel electrode PE can be disposed in the emission area EA.

A portion of the pixel electrode PE can extend to an area where the subpixel circuit SPC is disposed, and can be electrically connected to an electrode (e.g., source electrode or drain electrode) corresponding to the first node N1 of the driving transistor DRT in the subpixel circuit SPC through a contact hole CNT.

Figure 4:
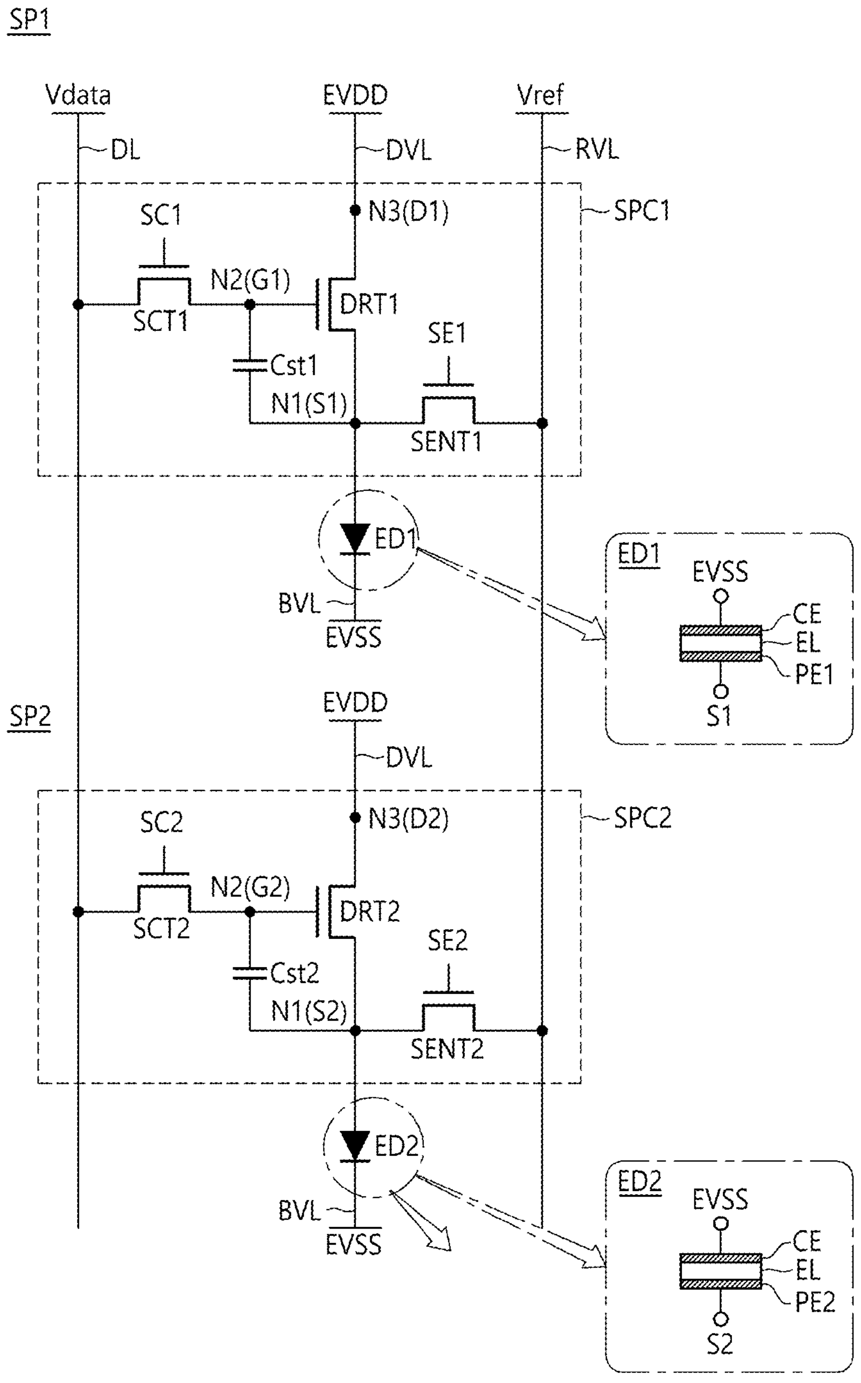
FIG. 4 is an equivalent circuit of first and second subpixel adjacent to each other in a column direction in a display device according to embodiments of the present disclosure.

FIG. 4 is an equivalent circuit of first and second subpixels SP1 and SP2 adjacent to each other in a column direction in a display device 100 according to embodiments of the present disclosure.

Each of the first subpixel SP1 and the second subpixel SP2 can have the same structure (i.e., equivalent circuit) as the subpixel SP in FIG. 2.

Referring to FIG. 4, the first subpixel SP1 and the second subpixel SP2 can be disposed adjacent to each other in a column direction. Here, the column direction can refer to a direction in which the data line DL extends.

The first subpixel SP1 can include a first light emitting device ED1 and a first subpixel circuit SPC1 for driving the first light emitting device ED1.

The first subpixel circuit SPC1 can include a first driving transistor DRT1, a first scan transistor SCT1, a first sensing transistor SENT1, and a first storage capacitor Cst1.

The first driving transistor DRT1 can include a first node N1, a second node N2, and a third node N3. Hereinafter, for convenience of explanation, the first node N1, the second node N2, and the third node N3 of the first driving transistor DRT1 are referred to a first source electrode S1, a first gate electrode G1 and a first drain electrode D1, respectively.

The first scan transistor SCT1 can control the connection between the data line DL and the first gate electrode G1 of the first driving transistor DRT1 according to a first scan signal SC1.

The first sensing transistor SENT1 can control the connection between a reference voltage line RLV and the first source electrode S1 of the first driving transistor DRT1 according to the first sensing signal SE1.

The first storage capacitor Cst1 can be formed between the first gate electrode G1 and the first source electrode S1 of the first driving transistor DRT1.

The first light emitting device ED1 can include a first pixel electrode PE1, an emission layer EL, and a common electrode CE.

The second subpixel SP1 can include a second light emitting device ED2 and a second subpixel circuit SPC2 for driving the second light emitting device ED2.

The second subpixel circuit SPC2 can include a second driving transistor DRT2, a second scan transistor SCT2, a second sensing transistor SENT2, and a second storage capacitor Cst2.

The second driving transistor DRT2 can include a first node N1, a second node N2, and a third node N3. Hereinafter, for convenience of explanation, the first node N1, the second node N2, and the third node N3 of the second driving transistor DRT2 are referred to a second source electrode S2, a second gate electrode G2 and a second drain electrode D2, respectively.

The second scan transistor SCT2 can control the connection between the data line DL and the second gate electrode G2 of the second driving transistor DRT2 according to a second scan signal SC2.

The second sensing transistor SENT2 can control the connection between a reference voltage line RLV and the second source electrode S2 of the second driving transistor DRT2 according to the second sensing signal SE2.

The second storage capacitor Cst2 can be formed between the second gate electrode G2 and the second source electrode S2 of the second driving transistor DRT2.

The second light emitting device ED2 can include a second pixel electrode PE2, an emission layer EL, and a common electrode CE.

Meanwhile, the display device 100 according to embodiments of the present disclosure can include a repair structure which facilitates repair to normalize and improves the aperture rate, when a defect occurs in the subpixel circuit SPC within the subpixel SP during the panel manufacturing process.

Figure 5:
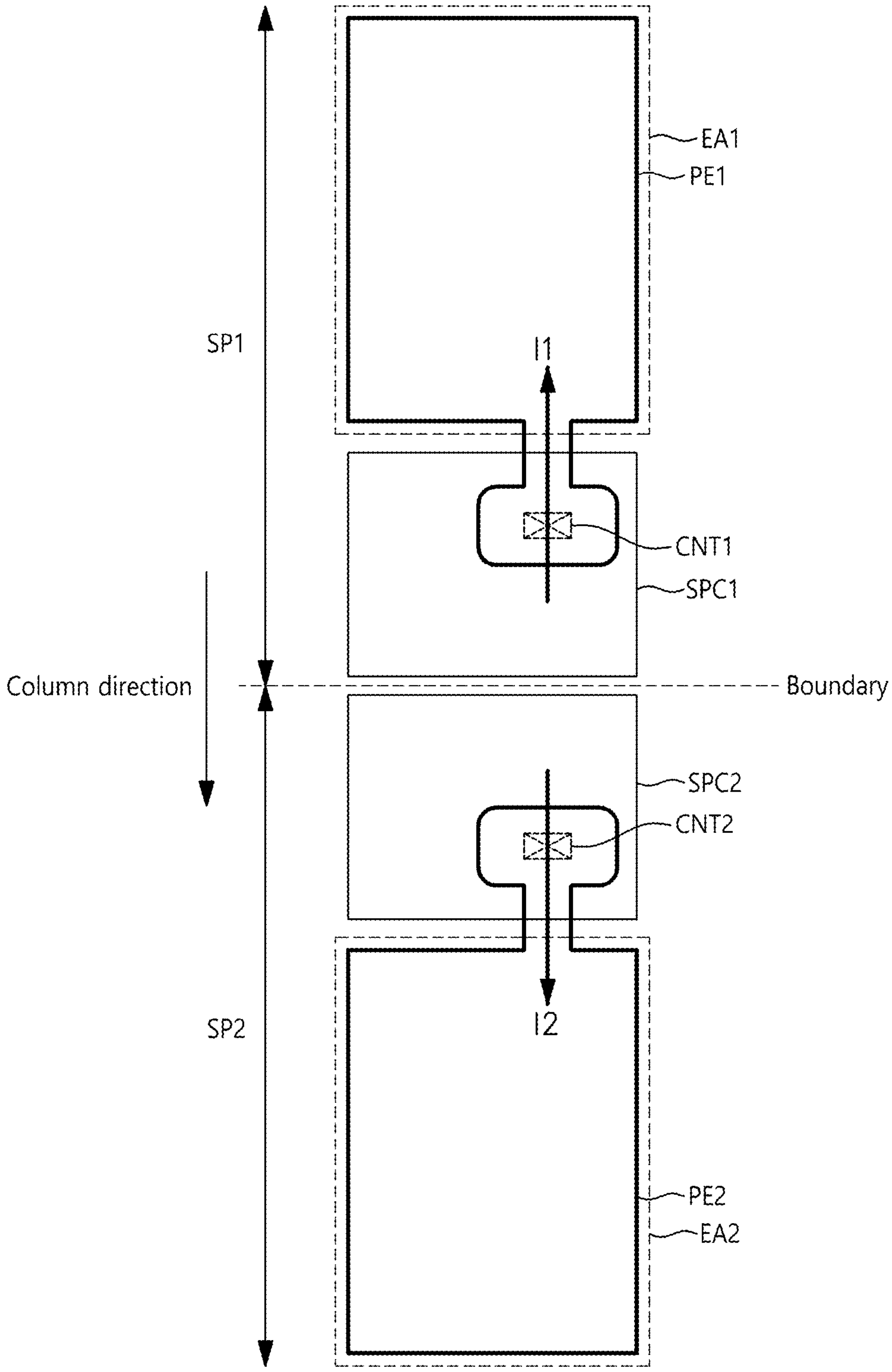
FIGS. 5 and 6 illustrate symmetrical structures of first and second subpixels adjacent to each other in a column direction in a display device according to embodiments of the present disclosure.
Figure 6:
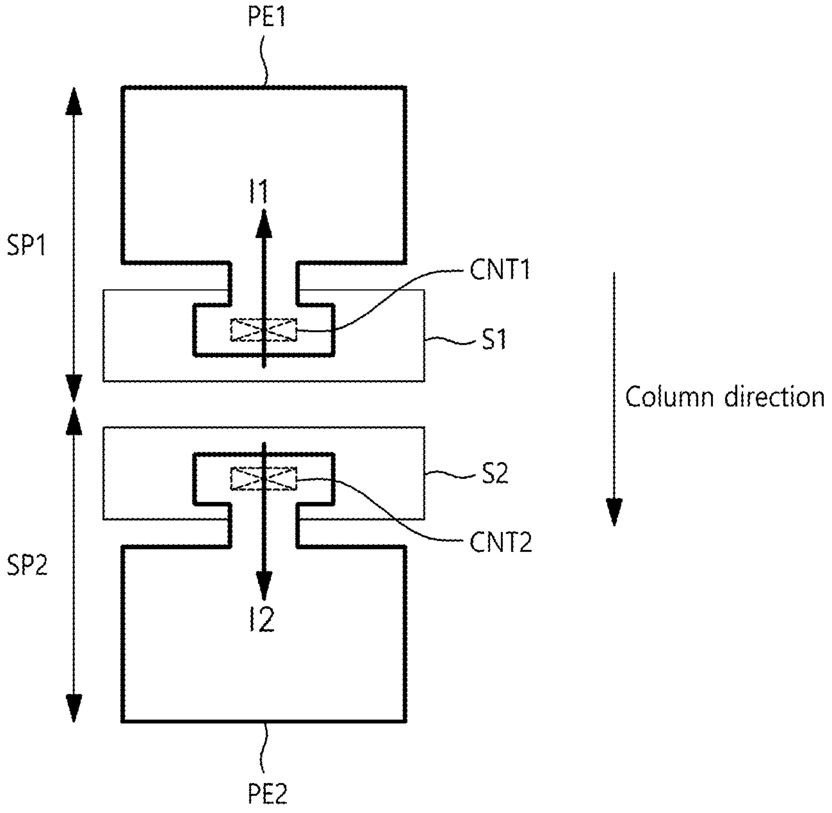

FIGS. 5 and 6 illustrate symmetrical structures of first and second subpixels SP1 and SP2 adjacent to each other in a column direction in a display device 100 according to embodiments of the present disclosure. In the following description, FIG. 4 is also referred to.

Referring to FIGS. 5 and 6, the first subpixel SP1 and the second subpixel SP2 can be disposed adjacent to each other in the column direction.

The first subpixel SP1 can include a first emission area EA1 and a first subpixel circuit SPC1.

The first pixel electrode PE1 can be disposed in the first emission area EA1, and a portion of the first pixel electrode PE1 can extend to the area where the first subpixel circuit SPC1 is disposed, and can be electrically connected to a point (e.g., the first source electrode S1 of the first driving transistor DRT1) in the first subpixel circuit SPC1 through a first contact hole CNT1.

The second subpixel SP2 can include a second emission area EA2 and a second subpixel circuit SPC2.

The second pixel electrode PE2 can be disposed in the second emission area EA2, and a portion of the second pixel electrode PE2 can extend to the area where the second sub-pixel circuit SPC2 is disposed, and can be electrically connected to a point (e.g., the second source electrode S2 of the second driving transistor DRT2) in the second subpixel circuit SPC2 through a second contact hole CNT2.

The first subpixel SP1 and the second subpixel SP2 can have a symmetrical structure based on a boundary between the first subpixel SP1 and the second subpixel SP2.

According to the symmetrical structure of the first subpixel SP1 and the second subpixel SP2, the first subpixel circuit SPC1 can be disposed closer to the second subpixel circuit SPC2 among the second emission area EA2 and the second subpixel circuit SPC2.

Referring to FIG. 6, according to the symmetrical structure of the first subpixel SP1 and the second subpixel SP2, the first source electrode S1 can be disposed closer to the second source electrode S2 among the second source electrode S2 and the second pixel electrode PE2.

Referring to FIGS. 5 and 6, if each of the first subpixel SP1 and the second subpixel SP2 is a normal subpixel SP, the first subpixel circuit SPC1 can supply a first current I1 to the first light emitting device ED1, and the second subpixel circuit SPC2 can supply a second current I2 to the second light emitting device ED2.

Accordingly, the first current I1 can flow from the first source electrode S1 of the first driving transistor DRT1 to the first pixel electrode PE1, and the second current I2 can flow from the second source electrode S2 of the driving transistor DRT2 to the second pixel electrode PE2.

Figure 7:
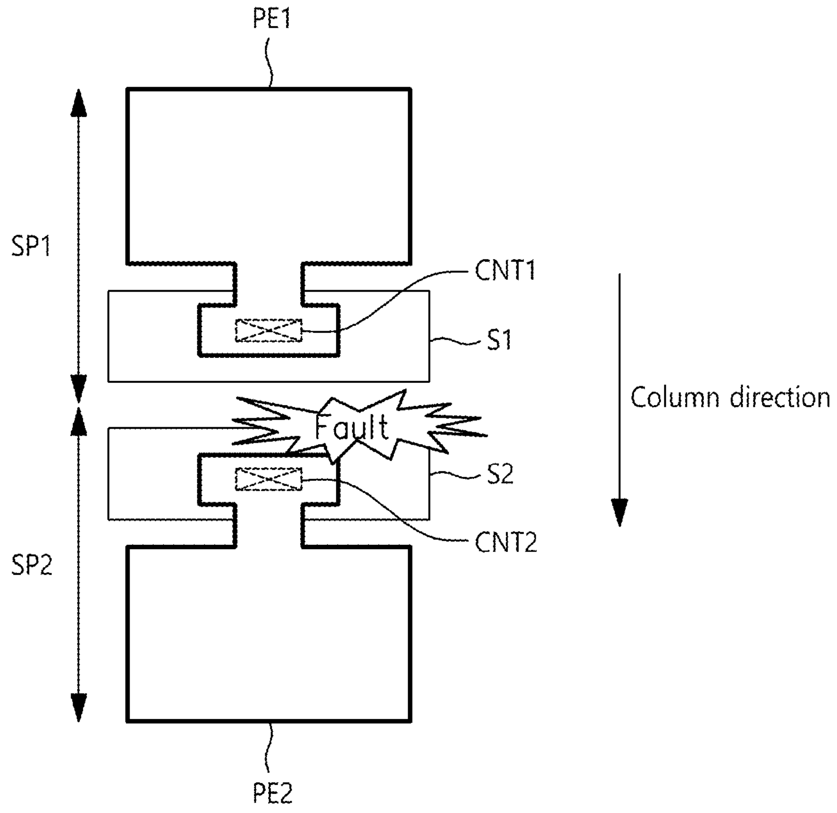
FIG. 7 illustrates a case in which a defect occurs in a second subpixel among first and second subpixels adjacent in a column direction in a display device according to embodiments of the present disclosure.

FIG. 7 illustrates a case in which a defect occurs in a second subpixel SP2 among first and second subpixels SP1 and SP2 adjacent in a column direction in a display device 100 according to embodiments of the present disclosure. In the following description, FIGS. 4 to 6 are also referred to.

Referring to FIG. 7, during the panel manufacturing process, a defect can occur in the second subpixel circuit SPC2 in the second subpixel SP2 among the first and second subpixels SP1 and SP2. In this case, the second subpixel SP2 may not emit light normally, which can cause image quality deterioration.

For example, if a defect (e.g., circuit disconnection, etc.) occurs in the second subpixel circuit SPC2, the current is not supplied from the second subpixel circuit SPC2 to the second light emitting device ED2. As a result, the second light emitting device ED2 may not emit light. In this case, the second subpixel SP2 can appear as a dark spot, which can cause an image abnormality.

For example, a defect occurring in the second subpixel circuit SPC2 can be a defect in the second driving transistor DRT2 within the second subpixel circuit SPC2. For example, if at least one of the second source electrode S2, the second drain electrode D2, and the second gate electrode G2 of the second driving transistor DRT2 is disconnected or broken due to foreign matter generated during the process, there can be occurred a defect in the second driving transistor DRT2.

In this specification, a subpixel SP in which a defect occurs can be referred to as a defective subpixel, and a subpixel SP in which a defect does not occur can be referred to as a normal subpixel.

Figure 8:
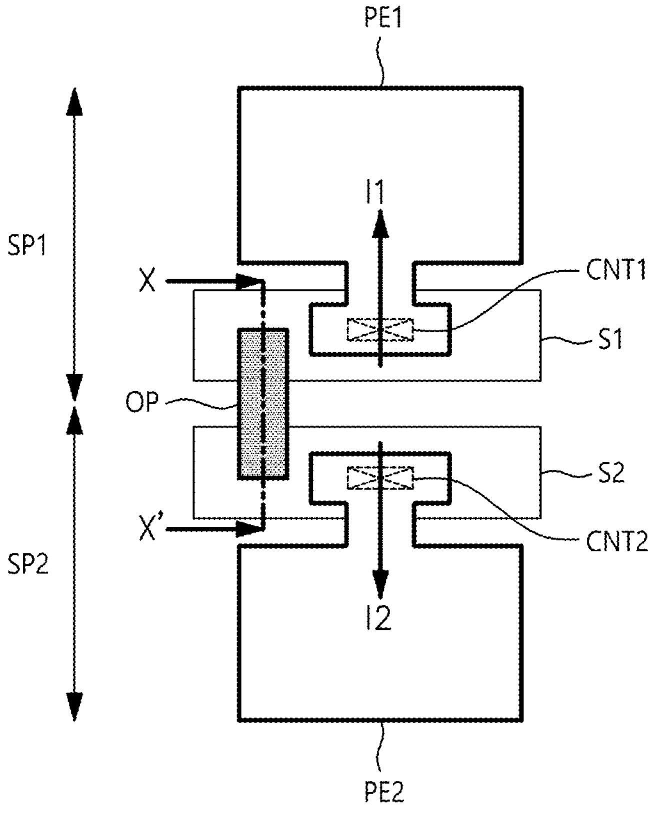
FIGS. 8 and 9 illustrate a repair structure of a display device according to embodiments of the present disclosure.
Figure 9:
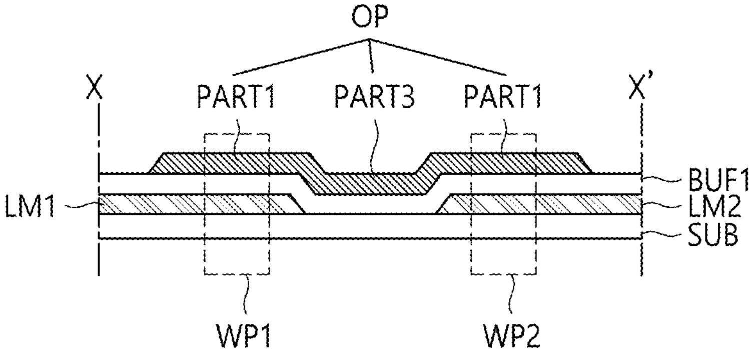

FIG. 8 illustrates a repair structure of the display device 100 according to embodiments of the present disclosure, and FIG. 9 is a cross-sectional view along line X-X' of FIG. 8. However, it is assumed that each of the first subpixel SP1 and the second subpixel SP2 shown in FIGS. 8 and 9 is a normal subpixel.

Referring to FIG. 8, the first subpixel SP1 can include a first pixel electrode PE1 and a first source electrode S1, and the second subpixel SP2 can include a second pixel electrode PE2 and a second source electrode S2.

Each of the first source electrode S1 and the second source electrode S2 can be formed of a single metal layer. Alternatively, each of the first source electrode S1 and the second source electrode S2 can be formed of a plurality of metal layers. Alternatively, each of the first source electrode S1 and the second source electrode S2 can include a plurality of electrodes electrically connected to each other.

If the first subpixel SP1 is a normal subpixel, the first current I1 can flow from the first source electrode S1 to the first pixel electrode PE1. If the second subpixel SP2 is a normal subpixel, the second current I2 can flow from the second source electrode S2 to the second pixel electrode PE2.

Referring to FIGS. 8 and 9, the display device 100 according to embodiments of the present disclosure can include a repair structure to repair a defect, if a defect occurs in one of the first subpixel SP1 and the second subpixel SP2.

The repair structure of the display device 100 according to embodiments of the present disclosure can include an overlapping patterns OP which overlaps in a vertical direction with at least one of the first source electrode S1 and the second source electrode S2.

The repair structure of the display device 100 according to embodiments of the present disclosure can include a first lower metal LM1 connected to the first source electrode S1 and a second lower metal LM2 connected to the second source electrode S2.

The first lower metal LM1 can be disposed in an area of the first subpixel SP1, and the second lower metal LM2 can be disposed in an area of the second subpixel SP2.

In this case, as shown in FIG. 9, as an example, the overlapping pattern OP can include a first part PART1 overlapping with a portion of the first lower metal LM1, a second part PART2 overlapping with a part of the second lower metal LM2, and a third part PART3 between the first part PART1 and the second part PART2.

Referring to FIG. 9, the first lower metal LM1 and the second lower metal LM2 can be disposed on the substrate SUB, a first buffer layer BUF1 can be disposed on the first lower metal LM1 and the second lower metal LM2, and the overlapping pattern OP can be disposed on the first buffer layer BUF1.

Accordingly, the first lower metal LM1 and the second lower metal LM2 can be spaced apart from the overlapping pattern OP by the first buffer layer BUF1.

The first lower metal LM1 and the second lower metal LM2 can be formed as the lowest metal layer in the display panel 110 closest to the substrate SUB. The overlapping pattern OP can be formed of a metal layer that is second closest to and second lowest to the substrate SUB in the display panel 110.

The first lower metal LM1 can overlap with the first driving transistor DRT1, and the second lower metal LM2 can overlap with the second driving transistor DRT2. For example, the first lower metal LM1 can overlap with a first active layer ACT1 of the first driving transistor DRT1, and the second lower metal LM2 can overlap with a second active layer ACT2 of the second driving transistor DRT2.

Figure 10:
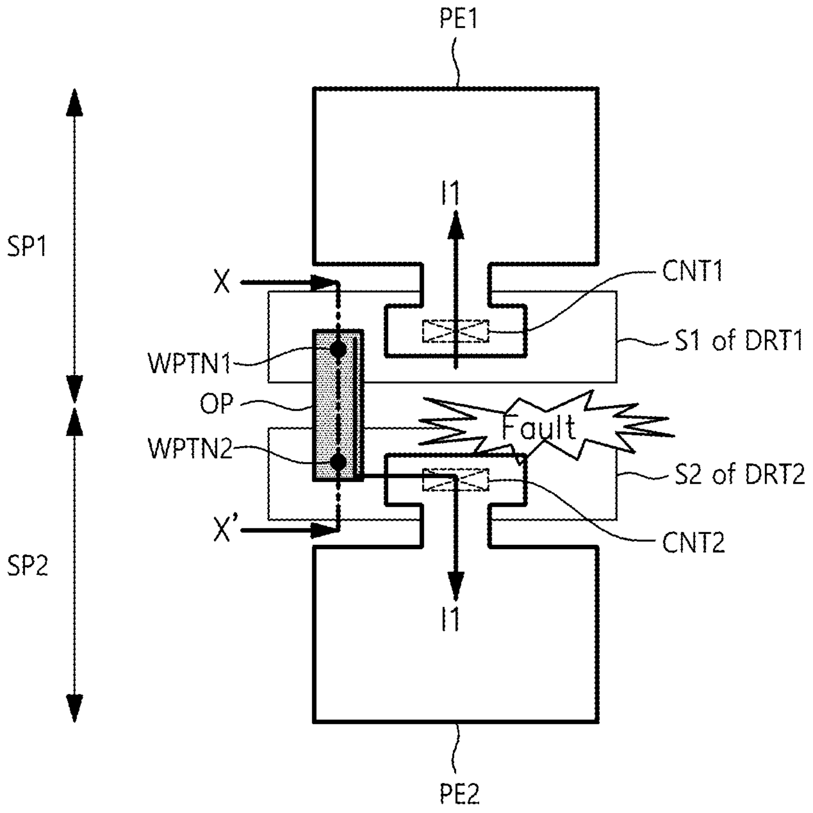
FIGS. 10 and 11 illustrate a welding repair processing when a defect occurs in a second subpixel circuit within a second subpixel among first and second subpixels adjacent in the column direction in a display device according to embodiments of the present disclosure.
Figure 11:
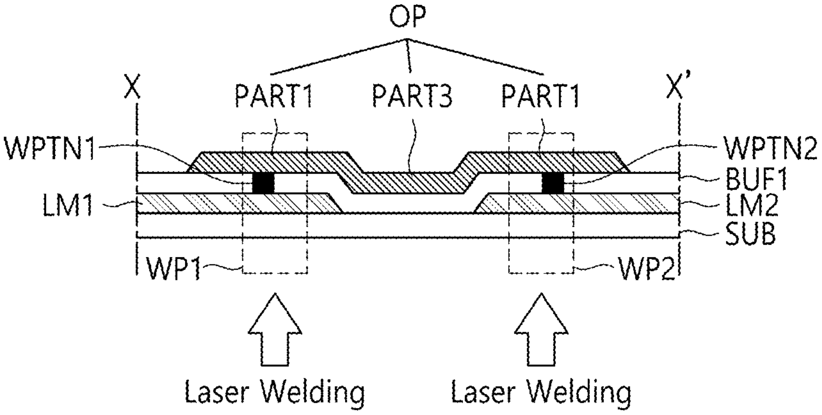

FIG. 10 illustrates a welding repair processing when a defect occurs in a second subpixel circuit SPC2 within a second subpixel SP2 among first and second subpixels SP1 and SP2 adjacent in the column direction in a display device 100 according to embodiments of the present disclosure. FIG. 11 is a cross-sectional view along line X-X' of FIG. 10.

Referring to FIGS. 10 and 11, the first lower metal LM1 can be connected to the first source electrode S1 of the first driving transistor DRT1, and the second lower metal LM2 can be connected to the second source electrode S2 of the second driving transistor DRT2.

Before welding repair processing, the first part PART1 of the overlapping pattern OP and the first lower metal LM1 may not only be arranged to be spaced apart from each other, but also can be electrically separated from each other. The second part PART2 of the overlapping pattern OP and the second lower metal LM2 may not only be arranged to be spaced apart from each other, but can also be electrically separated from each other.

If a defect occurs in the second subpixel circuit SPC2 in the second subpixel SP2 among the first and second subpixels SP1 and SP2 adjacent in the column direction, the first part PART1 of the overlapping pattern OP and the first lower metal LM1 can be electrically connected through a laser welding, and the second part PART2 of the overlapping pattern OP and the second lower metal LM2 can be electrically connected through a laser welding.

By performing the laser welding, a first welding pattern WPTN1 can be formed between the first part PART1 of the overlapping pattern OP and the first lower metal LM1, and a second welding pattern WPTN2 can be formed between the second part PART2 of the overlapping pattern OP and the second lower metal LM2.

The first welding pattern WPTN1 can be formed by welding to at least one of the first part PART1 of the overlapping pattern OP and the first lower metal LM1, or can be a pattern made of a material different from the first part PART1 of the overlapping pattern OP and the first lower metal LM1.

The second welding pattern WPTN2 can be formed by welding to at least one of the second part PART2 of the overlapping pattern OP and the second lower metal LM2, or can be a pattern made of a material different from the second part PART2 of the overlapping pattern OP and the second lower metal LM2.

Accordingly, the first driving transistor DRT1 may not only supply the first current I1 to the first pixel electrode PE1, but also supply the first current I1 to the second pixel electrode PE2. As a result, the first light emitting device ED1 of the first subpixel SP1 can emit light, and the second light emitting device ED2 of the second subpixel SP2 can emit light.

Even though a defect occurs in the second subpixel circuit SPC2 of the second subpixel SP2, the second light emitting device ED2 can emit light normally through the first driving transistor DRT1 of the first subpixel SP1, thereby normalizing the second subpixel SP2.

Figure 12:
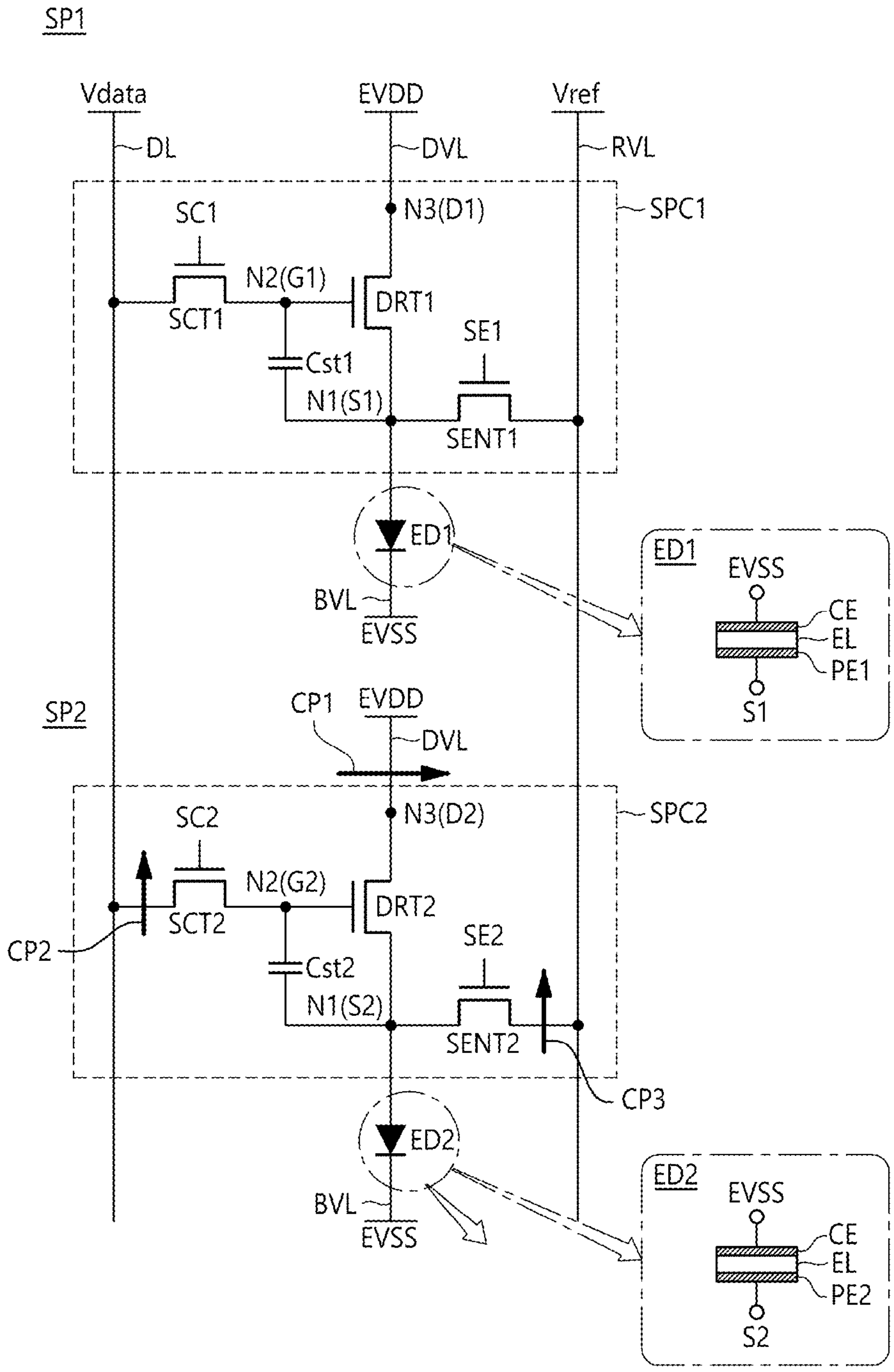
FIG. 12 illustrates an equivalent circuit showing cutting points for disabling the second subpixel circuit in the second subpixel, when a defect occurs in a second subpixel circuit in a second subpixel among first and second subpixels adjacent in the column direction in a display device according to embodiments of the present disclosure.

FIG. 12 illustrates an equivalent circuit showing cutting points CP1, CP2 and CP3 for disabling the second subpixel circuit SPC2 in the second subpixel SP2, when a defect occurs in a second subpixel circuit SPC2 in a second subpixel SP2 among first and second subpixels SP1 and SP2 adjacent in the column direction in a display device 100 according to embodiments of the present disclosure.

Referring to FIG. 12, the display panel 110 according to embodiments of the present disclosure can include a driving voltage line DVL for transmitting a driving voltage EVDD to the first drain electrode D1 of the first driving transistor DRT1 and the second drain electrode D2 of the second driving transistor DRT2.

The display panel 110 according to embodiments of the present disclosure can include a data line DL for transmitting a data voltage Vdata, a first scan transistor SCT1 for controlling the connection between the data line DL and the first gate electrode G1 of the first driving transistor DRT1, and a second scan transistor SCT2 for controlling the connection between the data line DL and the second gate electrode G2 of the second driving transistor DRT2.

The display panel 110 according to embodiments of the present disclosure can include a reference voltage line RVL for transmitting a reference voltage, a first sensing transistor SENT1 for controlling the connection between the reference voltage line RVL and the first source electrode S1 of the first driving transistor DRT1, and a second sensing transistor SENT2 for controlling the connection between the reference voltage line RVL and the second source electrode S2 of the second driving transistor DRT2.

If a defect occurs in the second subpixel circuit SPC2 in the second subpixel SP2 among the first and second subpixels SP1 and SP2 adjacent in the column direction, at least one of the driving voltage EVDD, the data voltage Vdata, and reference voltage Vref is required to not be supplied to the second subpixel circuit SPC2 in order to disable the second subpixel circuit SPC2 in the subpixel SP2.

The cutting points for disabling the second subpixel circuit SPC2 in the second subpixel SP2 can include a first cutting point CP1 for blocking the supply of driving voltage EVDD, a second cutting point CP2 for blocking the supply of the data voltage Vdata, and a third cutting point CP3 for blocking the supply of reference voltage Vref.

The first cutting point CP1 can be a connection point between the driving voltage line DVL and the second subpixel circuit SPC2, and the second cutting point CP2 can be a connection point between the data line DL and the second subpixel circuit SPC2, and the third cutting point CP3 can be a connection point between the reference voltage line RVL and the second subpixel circuit SPC2.

If both the first subpixel circuit SPC1 and the second subpixel circuit SPC2 are normal, the first current I1 can be supplied from the first driving transistor DRT1 to the first pixel electrode PE1, and the second current I2 can be supplied from the second driving transistor DRT2 to the second pixel electrode PE2. In this case, the driving voltage line DVL and the first drain electrode D1 can be electrically connected, and the driving voltage line DVL and the second drain electrode D2 can be electrically connected.

If the second subpixel circuit SPC2 among the first subpixel circuit SPC1 and the second subpixel circuit SPC2 is defective, the first current I1 can be supplied from the first driving transistor DRT1 to the first pixel electrode PE1 and the second pixel electrode PE2. In this case, the driving voltage line DVL and the first drain electrode D1 can be electrically connected, but the driving voltage line DVL and the second drain electrode D2 can be electrically disconnected.

If both the first subpixel circuit SPC1 and the second subpixel circuit SPC2 are normal, the first current I1 can be supplied from the first driving transistor DRT1 to the first pixel electrode PE1, and the second current I2 can be supplied from the second driving transistor DRT2 to the second pixel electrode PE2. In this case, the data line DL and the first scan transistor SCT1 can be connected, and the data line DL and the second scan transistor SCT2 can be connected.

If the second subpixel circuit SPC2 among the first subpixel circuit SPC1 and the second subpixel circuit SPC2 is defective, the first current I1 can be supplied from the first driving transistor DRT1 to the first pixel electrode PE1 and the second pixel electrode PE2. In this case, the data line DL and the first scan transistor SCT1 can be connected, but the data line DL and the second scan transistor SCT2 can be disconnected.

If both the first subpixel circuit SPC1 and the second subpixel circuit SPC2 are normal, the first current I1 can be supplied from the first driving transistor DRT1 to the first pixel electrode PE1, and the second current I2 can be supplied from the second driving transistor DRT2 to the second pixel electrode PE2. In this case, the reference voltage line RVL and the first sensing transistor SENT1 can be connected, and the reference voltage line RVL and the second sensing transistor SENT2 can be connected.

If the second subpixel circuit SPC2 among the first subpixel circuit SPC1 and the second subpixel circuit SPC2 is defective, the first current I1 can be supplied from the first driving transistor DRT1 to the first pixel electrode PE1 and the second pixel electrode PE2. In this case, the reference voltage line RVL and the first sensing transistor SENT1 can be connected, but the reference voltage line RVL and the second sensing transistor SENT2 can be disconnected.

Figure 13:
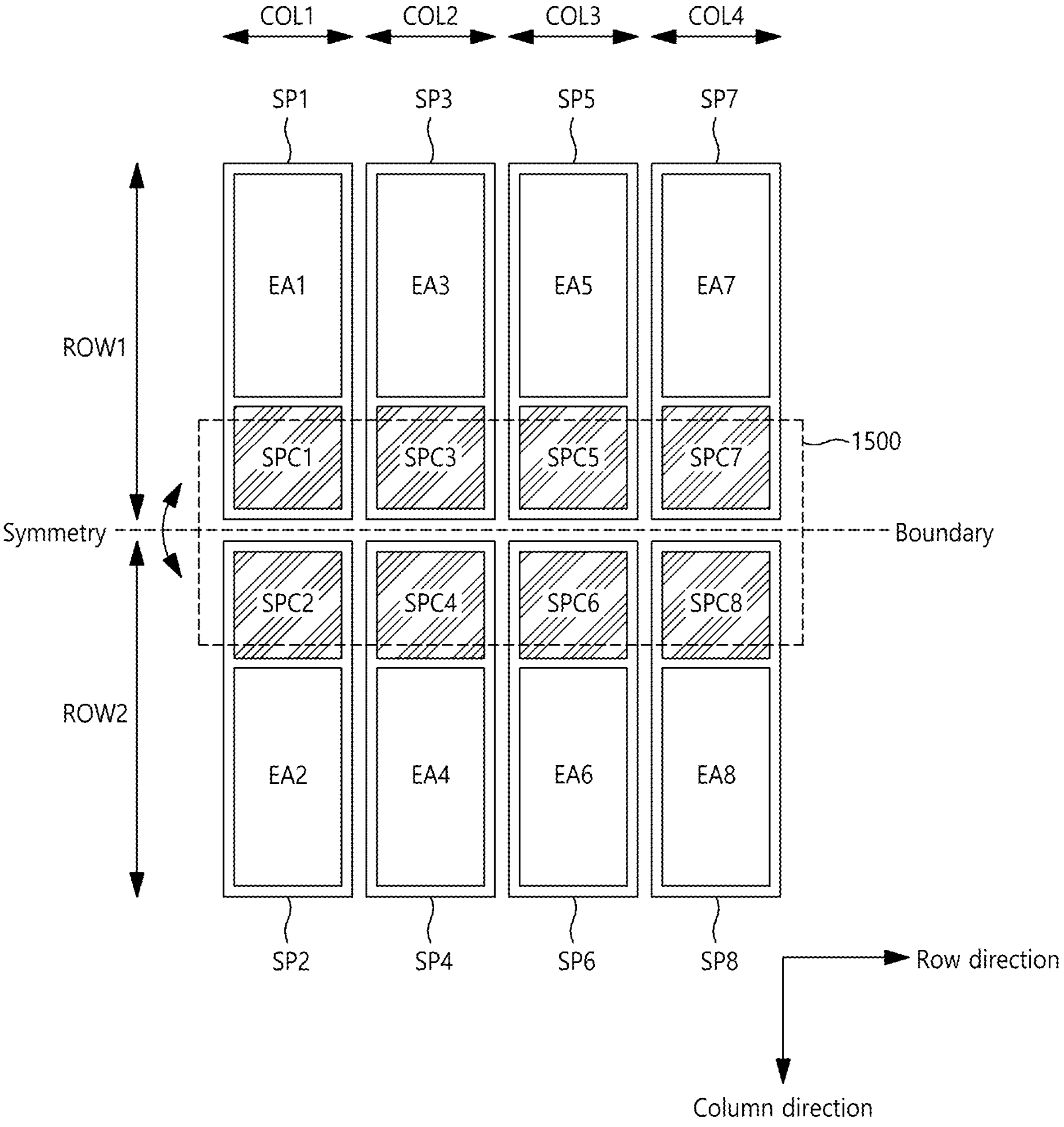
FIG. 13 illustrates first to eighth subpixels in a display panel according to embodiments of the present disclosure.
Figure 14:
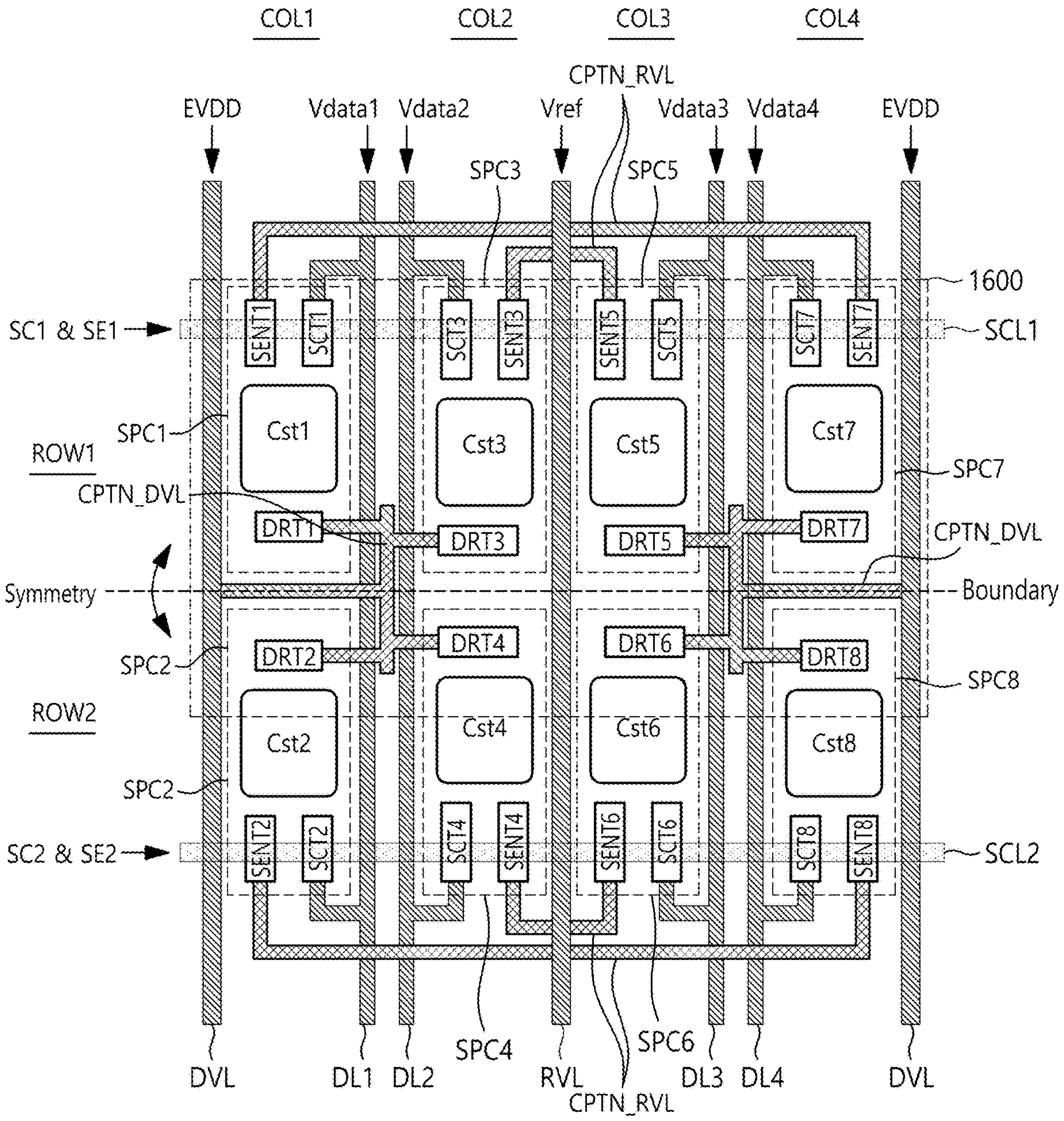
FIG. 14 is a plan view of a circuit cluster area of FIG. 13.

FIG. 13 illustrates first to eighth subpixels SP1 to SP8 in a display panel 110 according to embodiments of the present disclosure. FIG. 14 is a plan view of a circuit cluster area 1500 of FIG. 13.

Referring to FIG. 13, the first subpixel SP1, the third subpixel SP3, the fifth subpixel SP5, and the seventh subpixel SP7 can be disposed in a first subpixel row ROW1, and can be disposed in a row direction. The second subpixel SP2, the fourth subpixel SP4, the sixth subpixel SP6, and the eighth subpixel SP8 can be disposed in a second subpixel row ROW2, and can be arranged in the row direction.

The first subpixel SP1 and the second subpixel SP2 can be disposed in a first subpixel column COL1 and adjacent to each other in a column direction. The third subpixel SP3 and the fourth subpixel SP4 can be disposed in a second subpixel column COL2 and adjacent to each other in the column direction. The fifth subpixel SP5 and the sixth subpixel SP6 can be disposed in a third subpixel column COL3 and adjacent to each other in the column direction. The seventh subpixel SP7 and the eighth subpixel SP8 can be disposed in a fourth subpixel column COL4 and adjacent to each other in the column direction.

The first subpixel SP1 can include a first emission area EA1 and a first subpixel circuit SPC1. The second subpixel SP2 can include a second emission area EA2 and a second subpixel circuit SPC2. The third subpixel SP3 can include a third emission area EA3 and a third subpixel circuit SPC3. The fourth subpixel SP4 can include a fourth emission area EA4 and a fourth subpixel circuit SPC4. The fifth subpixel SP5 can include a fifth emission area EA5 and a fifth subpixel circuit SPC5. The sixth subpixel SP6 can include a sixth emission area EA6 and a sixth subpixel circuit SPC6. The seventh subpixel SP7 can include a seventh emission area EA7 and a seventh subpixel circuit SPC7. The eighth subpixel SP8 can include an eighth emission area EA8 and an eighth subpixel circuit SPC8.

Referring to FIG. 13, the first subpixel SP1 and the second subpixel SP2 adjacent in the column direction can have a symmetrical structure with respect to the boundary. Accordingly, the first subpixel circuit SPC1 and the second subpixel circuit SPC2 can be disposed between the first emission area EA1 and the second emission area EA2, and the first subpixel circuit SPC1 and the second subpixel circuit SPC2 can be disposed adjacent to each other.

The third subpixel SP3 and the fourth subpixel SP4 adjacent in the column direction can have a symmetrical structure with respect to the boundary. Accordingly, the third subpixel circuit SPC3 and the fourth subpixel circuit SPC4 can be disposed between the third emission area EA3 and the fourth emission area EA4, and the third subpixel circuit SPC3 and the fourth subpixel circuit SPC4 can be disposed adjacent to each other.

The fifth subpixel SP5 and the sixth subpixel SP6 adjacent in the column direction can have a symmetrical structure with respect to the boundary. Accordingly, the fifth subpixel circuit SPC5 and the sixth subpixel circuit SPC6 can be disposed between the fifth emission area EA5 and the sixth emission area EA6, and the fifth subpixel circuit SPC5 and the sixth subpixel circuit SPC6 can be disposed adjacent to each other.

The seventh subpixel SP7 and the eighth subpixel SP8 adjacent in the column direction can have a symmetrical structure with respect to the boundary. Accordingly, the seventh subpixel circuit SPC7 and the eighth subpixel circuit SPC8 can be disposed between the seventh and eighth emission areas EA7 and EA8, and the seventh subpixel circuit SPC7 and the eighth subpixel circuit SPC8 can be disposed adjacent to each other.

Hereinafter, the symmetrical structure of two subpixels SP adjacent to each other in the column direction can be referred to as a "vertically symmetrical structure."

Referring to FIG. 13, it will be described a schematic planar structure of the circuit cluster area 1500 where the first to eighth subpixel circuits SPC1 to SPC8 are gathered with reference to FIG. 14.

Referring to FIG. 14, the first subpixel circuit SPC1 can include a first driving transistor DRT1, a first scan transistor SCT1, a first sensing transistor SENT1, and a first storage capacitor Cst1. The second subpixel circuit SPC2 can include a second driving transistor DRT2, a second scan transistor SCT2, a second sensing transistor SENT2, and a second storage capacitor Cst2. The third subpixel circuit SPC3 can include a third driving transistor DRT3, a third scan transistor SCT3, a third sensing transistor SENT3, and a third storage capacitor Cst3. The fourth subpixel circuit SPC4 can include a fourth driving transistor DRT4, a fourth scan transistor SCT4, a fourth sensing transistor SENT4, and a fourth storage capacitor Cst4. The fifth subpixel circuit SPC5 can include a fifth driving transistor DRT5, a fifth scan transistor SCT5, a fifth sensing transistor SENT5, and a fifth storage capacitor Cst5. The sixth subpixel circuit SPC6 can include a sixth driving transistor DRT6, a sixth scan transistor SCT6, a sixth sensing transistor SENT6, and a sixth storage capacitor Cst6. The seventh subpixel circuit SPC7 can include a seventh driving transistor DRT7, a seventh scan transistor SCT7, a seventh sensing transistor SENT7, and a seventh storage capacitor Cst7, and the eighth subpixel circuit SPC8 can include an eighth driving transistor DRT8, an eighth scan transistor SCT8, an eighth sensing transistor SENT8, and an eighth storage capacitor Cst8.

It will be described an arrangement structure of the column lines DL1 to DLA, DVL and RVL with reference to FIG. 14.

A first data line DL1 and a second data line DL2 can be disposed between a first subpixel column COL1 and a second subpixel column COL2. A third data line DL3 and a fourth data line DLA can be disposed between a third subpixel column COL3 and a fourth subpixel column COL4.

The first data line DL1 can supply a first data voltage Vdata1 to the first subpixel circuit SPC1 and the second subpixel circuit SPC2 disposed in the first subpixel column COL1. The first data line DL1 can be connected to the first scan transistor SCT1 in the first subpixel circuit SPC1 and the second scan transistor SCT2 in the second subpixel circuit SPC2.

The second data line DL2 can supply a second data voltage Vdata2 to the third subpixel circuit SPC3 and the fourth subpixel circuit SPC4 disposed in the second subpixel column COL2. The second data line DL2 can be connected to the third scan transistor SCT3 in the third subpixel circuit SPC3 and the fourth scan transistor SCT4 in the fourth subpixel circuit SPC4.

The third data line DL3 can supply a third data voltage Vdata3 to the fifth subpixel circuit SPC5 and the sixth subpixel circuit SPC6 disposed in the third subpixel column COL3. The third data line DL3 can be connected to the fifth scan transistor SCT5 in the fifth subpixel circuit SPC5 and the sixth scan transistor SCT6 in the sixth subpixel circuit SPC6.

The fourth data line DLA can supply a fourth data voltage Vdata4 to the seventh subpixel circuit SPC7 and the eighth subpixel circuit SPC8 disposed in the fourth subpixel column COL4. The fourth data line DLA can be connected to the seventh scan transistor SCT7 in the seventh subpixel circuit SPC7 and the eighth scan transistor SCT8 in the eighth subpixel circuit SPC8.

The reference voltage line RVL can be disposed between the second subpixel column COL2 and the third subpixel column COL3.

The reference voltage line RVL can be connected to the first to eighth subpixel circuits SPC1 to SPC8 arranged in the first to fourth subpixel columns COL1 to COLA. The reference voltage line RVL can be connected to the first to eighth subpixel circuits SPC1 to SPC8 arranged in the first to fourth subpixel columns COL1 to COL4 through a reference connection pattern CPTN_RVL.

The reference voltage line RVL can supply the reference voltage Vref to the drain nodes or source nodes of the first to eighth sensing transistors SENT1 to SENT8 in the first to eighth subpixel circuits SPC1 to SPC8 disposed in the first to fourth subpixel columns COL1 to COL4.

A driving voltage line DVL can be disposed on one side of the first subpixel column COL1 and on the other side of the fourth subpixel column COL4.

The driving voltage line DVL disposed on one side of the first subpixel column COL1 can be connected to the first to fourth subpixel circuits SPC1 to SPC4 disposed in the first and second subpixel columns COL1 and COL2. The driving voltage line DVL disposed on one side of the first subpixel column COL1 can be connected to the first to fourth subpixel circuits SPC1 to SPC4 arranged in the first and second subpixel columns COL1 and COL2 through a driving connection pattern CPTN_DVL.

The driving voltage line DVL disposed on one side of the first subpixel column COL1 can supply the driving voltage EVDD to the drain nodes or source nodes of the first to fourth scan transistors SCT1 to SCT4 in the first to fourth subpixel circuits SPC1 to SPC4 disposed in the first and second subpixel columns COL1 to COL2.

The driving voltage line DVL disposed on the other side of the fourth subpixel column COLA can be connected to the fifth to eighth subpixel circuits SPC5 to SPC8 disposed in the third and fourth subpixel columns COL3 and COL4. The driving voltage line DVL disposed on the other side of the fourth subpixel column COLA can be connected to the fifth to eighth subpixel circuits SPC5 to SPC8 disposed in the third and fourth subpixel columns COL3 and COLA through a driving connection pattern CPTN_DVL.

The driving voltage line DVL disposed on the other side of the fourth subpixel column COLA can supply the driving voltage EVDD to the drain nodes or source nodes of the fifth to eighth scan transistors SCT5 to SCT8 in the fifth to eighth subpixel circuits SPC5 to SPC8 disposed in the third and fourth subpixel columns COL3 and COLA, Since the first subpixel SP1 and the second subpixel SP2 have a vertically symmetrical structure, the first subpixel circuit SPC1 and the second subpixel circuit SPC2 can also have a vertically symmetrical structure.

Since the third subpixel SP3 and the fourth subpixel SP4 have a vertically symmetrical structure, the third subpixel circuit SPC3 and the fourth subpixel circuit SPC4 can also have a vertically symmetrical structure.

Since the fifth subpixel SP5 and the sixth subpixel SP6 have a vertically symmetrical structure, the fifth subpixel circuit SPC5 and the sixth subpixel circuit SPC6 can also have a vertically symmetrical structure.

Since the seventh subpixel SP7 and the eighth subpixel SP8 have a vertically symmetrical structure, the seventh subpixel circuit SPC7 and the eighth subpixel circuit SPC8 can also have a vertically symmetrical structure.

Hereinafter, it will be described a repair structure which facilitates repair and improves the aperture ratio in the display panel 110 according to embodiments of the present disclosure.

Figure 15:
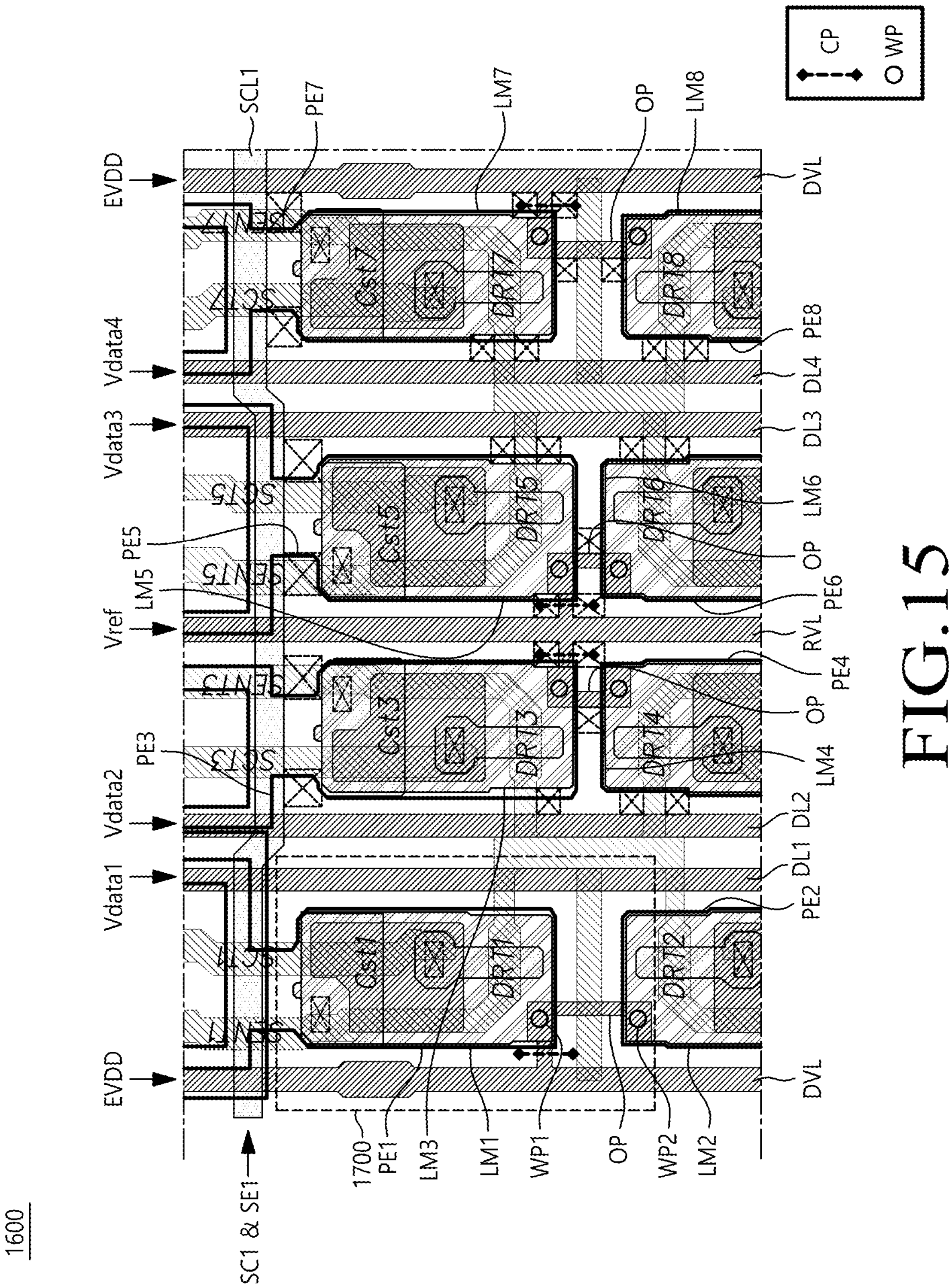
FIG. 15 is a plan view of a display panel according to embodiments of the present disclosure.
Figure 16:
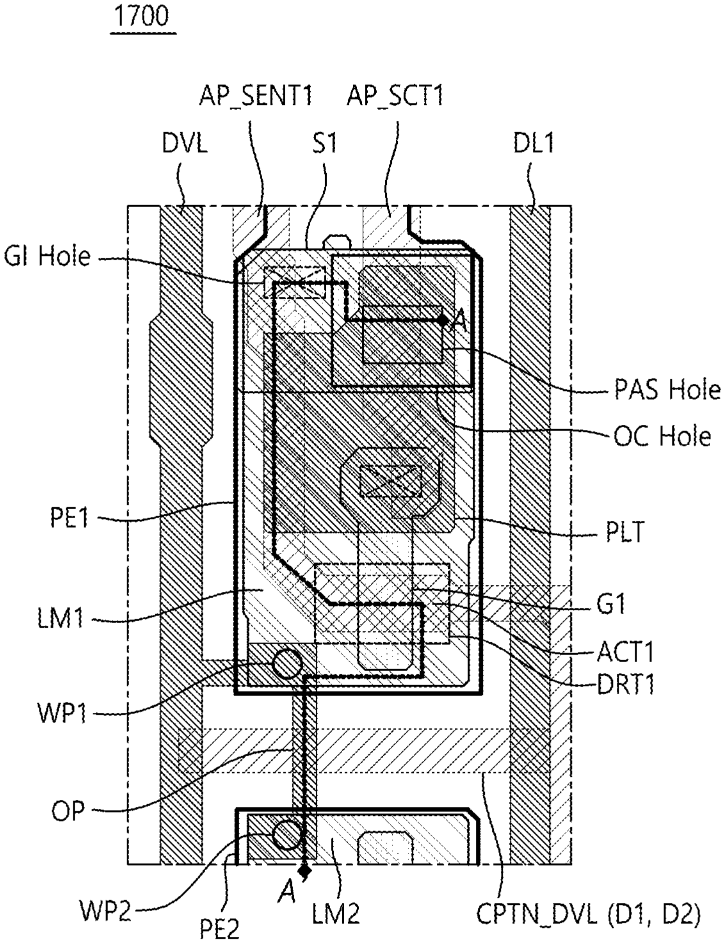
FIG. 16 is an enlarged plan view of a portion of FIG. 15.
Figure 17:
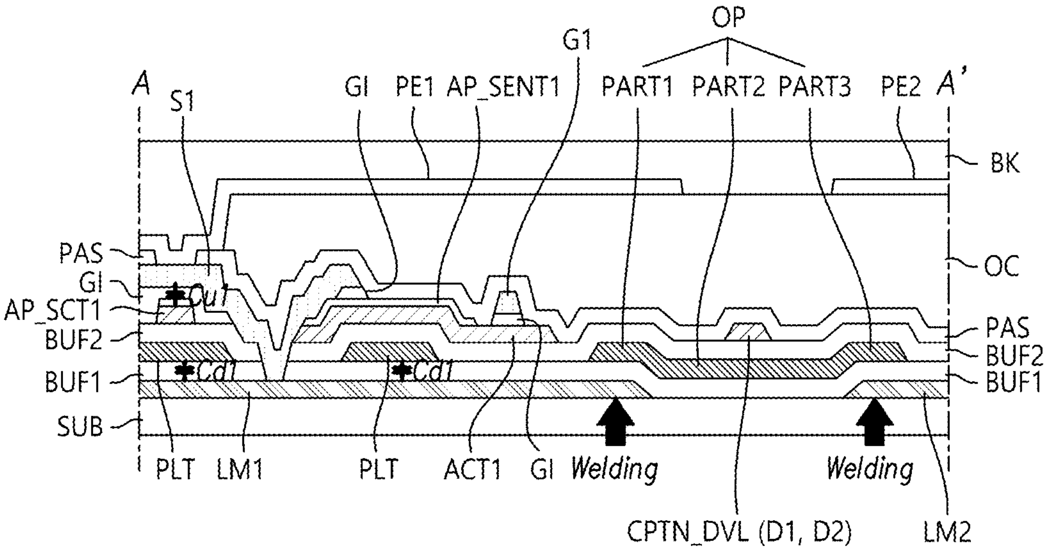
FIG. 17 is a cross-sectional view along line A-A' of FIG. 16.
Figure 18:
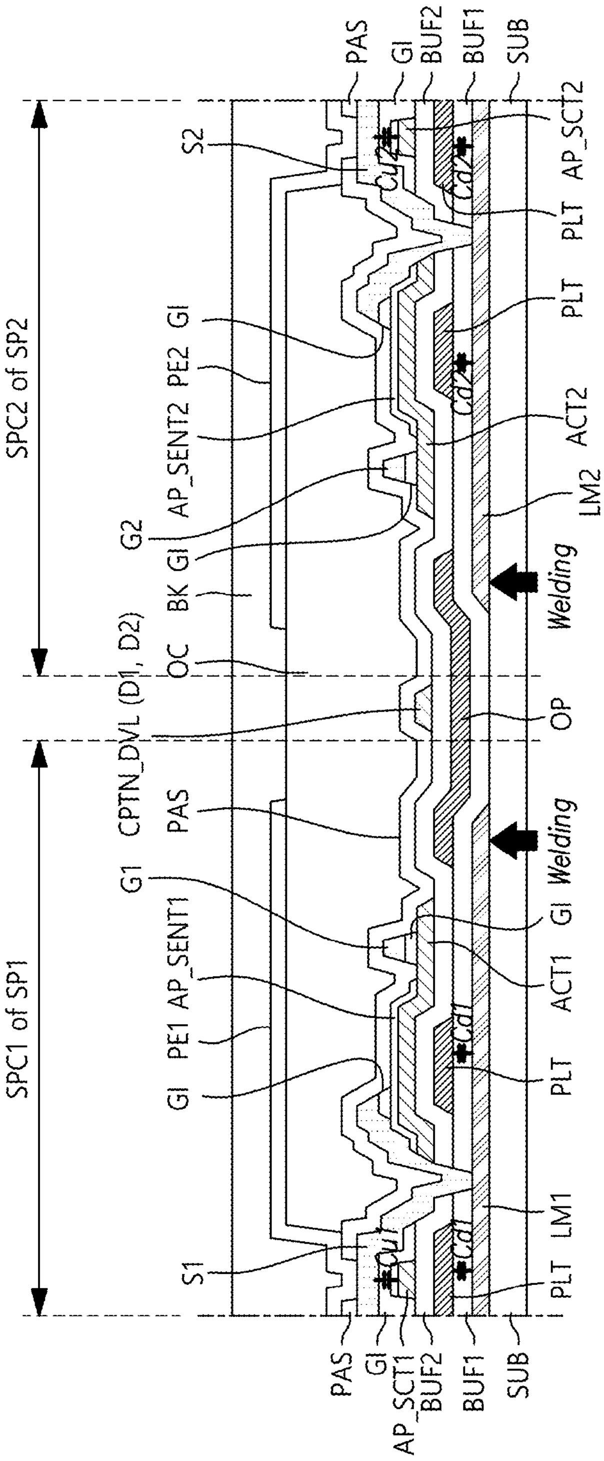
FIG. 18 is a cross-sectional view of first and second subpixels adjacent to each other in the column direction in a display device according to embodiments of the present disclosure.
Figure 19:
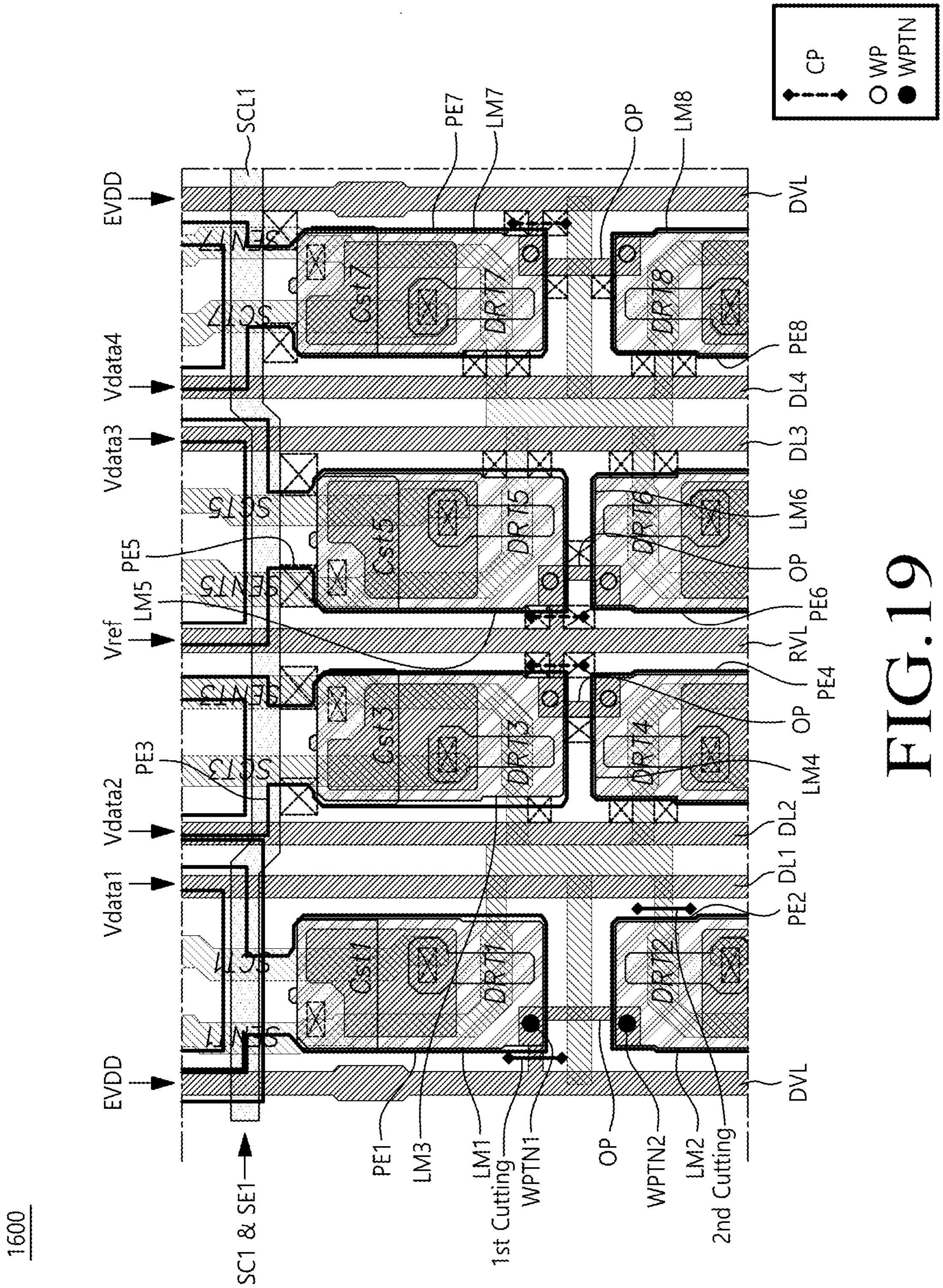
FIG. 19 is a plan view of a display panel on which repair processing has been performed.

FIG. 15 is a plan view of a partial area 1600 of FIG. 14, and FIG. 16 is an enlarged plan view of a partial area 1700 of FIG. 15. FIG. 17 is a cross-sectional view along line A-A' of FIG. 16, and FIG. 18 is a cross-sectional view of the first and second subpixels SP1 and SP2 adjacent in the column direction in the display device 100 according to embodiments of the present disclosure. FIG. 19 is a plan view of a partial area 1600 of FIG. 14, and is a plan view of the display panel 110 on which repair processing has been performed.

Referring to FIG. 15, the first subpixel circuit SPC1 and the second subpixel circuit SPC2 are adjacent to each other in the column direction, and can have a vertically symmetrical structure. The third subpixel circuit SPC3 and the fourth subpixel circuit SPC4 are adjacent to each other in the column direction, and can have a vertically symmetrical structure. The fifth subpixel circuit SPC5 and the sixth subpixel circuit SPC6 are adjacent to each other in the column direction, and can have a vertically symmetrical structure. The seventh subpixel circuit SPC7 and the eighth subpixel circuit SPC8 are adjacent to each other in the column direction, and can have a vertically symmetrical structure.

The repair structure of the display panel 110 according to embodiments of the present disclosure can include lower metals LM1 and LM2, LM3 and LM4, LM5 and LM6, LM7 and LM8 disposed on each of subpixel circuits SPC1 and SPC2, SPC3 and SPC4, SPC5 and SPC6, SPC7 and SPC8 having a vertically symmetrical structure, and overlapping pattern OP overlapping with the lower metals LM1 and LM2, LM3 and LM4, LM5 and LM6, LM7 and LM8 disposed on each of subpixel circuits SPC1 and SPC2, SPC3 and SPC4, SPC5 and SPC6, SPC7 and SPC8 having a vertically symmetrical structure.

Before the repair processing, the lower metals LM1 and LM2, LM3 and LM4, LM5 and LM6, LM7 and LM8 can be connected to adjacent power supply lines (e.g., driving voltage line DVL, reference voltage line RVL, etc.).

The connection points between the lower metals LM1 and LM2, LM3 and LM4, LM5 and LM6, LM7 and LM8 and the power supply lines (e.g., driving voltage line DVL, reference voltage line RVL, etc.) can be cut off during the repair processing. For example, the connection points between the lower metal LM1 and LM2, LM3 and LM4, LM5 and LM6, LM7 and LM8 and the constant power lines (e.g., driving voltage line DVL, reference voltage line RVL, etc.) can become the cutting points CP where cutting is performed during the repair processing.

In addition, during the repair processing, as shown in FIG. 12, there can also be performed a cutting processing to disable subpixel circuits. The cutting points CP1, CP2 and CP3 for disabling a subpixel circuit can be connection points between the subpixel circuit to be disabled and signal lines (e.g., DL, DVL, RVL).

Hereinafter, it will be described the repair structure in more detail through the first subpixel SP1 and the second subpixel SP2.

Referring to FIGS. 15 to 17, in the first subpixel circuit SPC1 and the second subpixel circuit SPC2 having a vertically symmetrical structure, the first lower metal LM1 can be disposed in the first subpixel circuit SPC1, the second lower metal LM2 can be disposed in the second sub-pixel circuit SPC2, and the overlapping pattern OP can overlap with at least a portion of the first lower metal LM1, and can overlap with at least a portion of the second lower metal LM2.

As shown in FIG. 17, in a first state, the overlapping pattern OP may not be electrically connected to the first lower metal LM1 and the second lower metal LM2.

Alternatively, in the first state, the overlapping pattern OP can be electrically connected to one of the first lower metal LM1 and the second lower metal LM2, and may not be electrically connected to the other one.

In a second state different from the first state, the overlapping pattern OP can be electrically connected to both the first lower metal LM1 and the second lower metal LM2.

The first state can mean a state in which both the first subpixel SP1 and the second subpixel SP2 are normal subpixels. In the first state, the first subpixel circuit SPC1 can supply a first current to the first light emitting device ED1, and the second subpixel circuit SPC2 can supply a second current to the second light emitting device ED2.

The second state can mean that, in the case that one of the first subpixel SP1 and the second subpixel SP2 is a normal subpixel and the other is a defective subpixel (i.e., abnormal subpixel), the defective subpixel has been repaired.

For example, among the first subpixel SP1 and the second subpixel SP2, if the first subpixel SP1 is a normal subpixel and the second subpixel SP2 is a defective subpixel (i.e., abnormal subpixel), the second state can be a state in which repair processing has been performed on the second subpixel SP2 and the second subpixel SP2 has been normalized.

In the second state, the first subpixel circuit SPC1 may not only supply the first current to the first light emitting device ED1, but also supply the first current to the second light emitting device ED2. The second subpixel circuit SPC2 can be disabled, and may not be able to supply current to the second light emitting device ED2.

The repair processing can include a welding processing (e.g., welding repair processing) and cutting processing (e.g., cutting repair processing).

A welding point WP, which is a point for welding processing, can include a point corresponding to the first part PART1 of the overlapping pattern OP and a point corresponding to the second part PART2 of the overlapping pattern OP.

With reference to FIGS. 17 and 18, it will be described a vertical structure of the display panel 110 including the repair structure.

Referring to FIGS. 17 and 18, the first lower metal LM1 and the second lower metal LM2 can be disposed on the substrate SUB. The first lower metal LM1 can be disposed in the area of the first subpixel circuit SPC1, and the second lower metal LM2 can be disposed in the area of the second subpixel circuit SPC2.

A first buffer layer BUF1 can be disposed on the first lower metal LM1 and the second lower metal LM2, and the overlapping pattern OP can be disposed on the first buffer layer BUF1.

A plate PLT of the first and second subpixel circuits SPC1 and SPC2 can be disposed on the first buffer layer BUF1 along with the overlapping pattern OP. The overlapping pattern OP and the plate PLT of the first and second subpixel circuits SPC1 and SPC2 can be located in the same layer and include the same material.

A second buffer layer BUF2 can be disposed on the plate PLT and the overlapping pattern OP.

Active layer patterns can be disposed on the second buffer layer BUF2.

For example, the active layer patterns can include an active layer pattern AP_SCT1 for forming a first active layer ACT1 of the first driving transistor DRT1 and an active layer of the first scan transistor SCT1, an active layer pattern AP_SENT1 for forming an active layer of the first sensing transistor SENT1, an active layer pattern AP_SCT2 for forming a second active layer ACT2 of the second driving transistor DRT2 and an active layer of the second scan transistor SCT2, and an active layer pattern AP_SENT2 for forming an active layer of the second sensing transistor SENT2.

For example, the active layer patterns can further include a driving connection pattern CPTN_DVL for connecting the driving voltage line DVL to the first drain electrode D1 of the first driving transistor DRT1 and the second drain electrode D2 of the second driving transistor DRT2.

For example, the active layer patterns can include an oxide semiconductor material.

A gate insulating layer GI can be disposed on the active layer patterns ACT1, AP_SCT1, AP_SENT1, ACT2, AP_SCT2, AP_SENT2, and CPTN_DVL.

Referring to FIGS. 16, 17, and 18, the first gate electrode G1 and the first source electrode S1 of the first driving transistor DRT1 can be disposed on the gate insulating layer GI. The second gate electrode G2 and the second source electrode S2 of the second driving transistor DRT2 can be disposed on the gate insulating layer GI.

The first source electrode S1 can be connected to the first lower metal LM1 through a hole of the gate insulating layer GI, the second buffer layer BUF2, and the first buffer layer BUF1.

The second source electrode S2 can be connected to the second lower metal LM2 through a hole (GI Hole) of the gate insulating layer GI, the second buffer layer BUF2, and the first buffer layer BUF1.

Referring to FIGS. 17 and 18, a passivation layer PAS can be disposed on a first gate electrode G1, a first source electrode S1, a second gate electrode G2, and a second source electrode S2.

An overcoat layer OC can be disposed on the passivation layer PAS.

Referring to FIGS. 16, 17, and 18, the first pixel electrode PE1 and the second pixel electrode PE2 can be disposed on the overcoat layer OC. The first pixel electrode PE1 can be connected to the first source electrode S1 through a hole (OC Hole) in the overcoat layer OC and a hole (PAS Hole) in the passivation layer PAS. The second pixel electrode PE2 can be connected to the second source electrode S2 through a hole (OC Hole) in the overcoat layer OC and a hole (PAS Hole) in the passivation layer PAS.

The hole (OC Hole) of the overcoat layer OC and the hole (PAS Hole) of the passivation layer PAS can overlap with each other. The hole (OC Hole) of the overcoat layer OC can be larger than the hole (PAS Hole) of the passivation layer PAS.

Positions of the hole (OC Hole) of the overcoat layer OC and the hole (PAS Hole) of the passivation layer PAS can be different from a position of the hole (GI Hole) of the gate insulating layer GI.

A bank BK can be disposed on the first pixel electrode PE1 and the second pixel electrode PE2. The bank BK can include a first opening (corresponding to (or overlapping with) the first emission area EA1 and a second opening corresponding to (or overlapping with) the second emission area EA2. A portion of the first pixel electrode PE1 can be exposed through the first opening of the bank BK, and a portion of the second pixel electrode PE2 can be exposed through the second opening of the bank BK.

It will be described a repair structure of the display device 100 according to the embodiments of the present disclosure again from the perspective of the first subpixel SP1 and the second subpixel SP2 adjacent in the column direction.

In the display device 100 according to embodiments of the present disclosure, if the first subpixel SP1 and the second subpixel SP2 have a vertically symmetrical structure and are a set for repair processing, a distance between the first source electrode S1 of the first driving transistor DRT1 and the second source electrode S2 of the second driving transistor DRT2 can be smaller than a distance between the first emission area EA1 of the first light emitting device ED1 and the second emission area EA2 of the second light emitting device ED2.

The display device 100 according to embodiments of the present disclosure can include a first subpixel SP1 including a first driving transistor DRT1 and a first light emitting device ED1, a second subpixel SP2 including a second driving transistor DRT2 and a second light emitting device ED2, a first lower metal LM1 connected to a first source electrode S1 of the first driving transistor DRT1, a second lower metal LM2 connected to the second source electrode S2 of the second driving transistor DRT2, an overlapping pattern OP including a first part PART1 overlapping with a part of the first lower metal LM1, a second part PART2 overlapping with a part of the second lower metal LM2, and a third part PART3 between the first part PART1 and the second part PART2, and a first buffer layer BUF1 disposed between the first lower metal LM1 and the second lower metal LM2 and the overlapping pattern OP.

In the display device 100 according to embodiments of the present disclosure, the first lower metal LM1 can be disposed below a first active layer ACT1 of the first driving transistor DRT1, and the second lower metal LM2 can be disposed below a first active layer ACT1 of the second driving transistor DRT2, and the overlapping pattern OP can be disposed below the first lower metal LM1 and the second lower metal LM2.

If it is identified during the process that the first subpixel SP1 and the second subpixel SP2 are normal subpixels, the repair processing can be not performed during the process. In this case, in the first state of the display panel 110, a first current I1 can be supplied from the first driving transistor DRT1 to the first pixel electrode PE1, and the second current I2 can be supplied from the second driving transistor DRT2 to the second pixel electrode PE2.

In this first state, the first part PART1 of the overlapping pattern OP and the first lower metal LM1 can be spaced apart from each other, and the second part PART2 of the overlapping pattern OP and the second lower metal LM2 can be spaced apart from each other.

In addition, in the first state, the overlapping pattern OP can be electrically connected to a common power line. For example, the common power line can include one or more of a driving voltage line DVL, a reference voltage line RVL, and a base voltage line BVL.

In the first state, if the overlapping pattern OP is floating and not electrically connected to the common power line, foreign matter can be generated around the overlapping pattern OP, which can cause defects in the repair structure. Therefore, in the first state, there can prevent the defects due to the repair structure by electrically connecting the overlapping pattern OP to the adjacent common power line, thereby increasing the performance and repair success possibility.

If it is identified during the process that the first subpixel SP1 is a normal subpixel and the second subpixel SP2 is a defective subpixel, there can be performed the repair processing for normalizing the second subpixel SP2 (for example, a repair processing for causing the second light emitting device ED2 to emit light) during the process. In this case, in the second state of the display panel 110, the first current I1 can be supplied from the first driving transistor DRT1 to the first pixel electrode PE1 and the second pixel electrode PE2.

In the second state, the first part PART1 of the overlapping pattern OP and the first lower metal LM1 can be connected, and the second part PART2 of the overlapping pattern OP and the second lower metal LM2 can be connected.

Additionally, in the second state, the overlapping pattern OP can be electrically disconnected from the common power line. For example, the common power line can include one or more of a driving voltage line DVL, a reference voltage line RVL, and a base voltage line BVL.

The display device 100 according to embodiments of the present disclosure can include a first driving transistor DRT1 including a first active layer ACT1, a first source electrode S1, a first drain electrode D1 and a first gate electrode G1, a first pixel electrode PE1 electrically connected to the first source electrode S1, a second driving transistor DRT2 including a second active layer ACT2, a second source electrode S2, a second drain electrode D2 and a second gate electrode G2, and a second pixel electrode PE2 electrically connected to the second source electrode S2.

The display device 100 according to embodiments of the present disclosure can include a first lower metal LM1 electrically connected to the first source electrode S1 and overlapping with the first active layer ACT1, a second lower metal LM2 electrically connected to the second source electrode S2 and overlapping with the second active layer ACT2, a first buffer layer BUF1 disposed on the first lower metal LM1 and the second lower metal LM2, an overlapping pattern OP disposed on the first buffer layer BUF1 and including a first part PART1 overlapping with a part of the first lower metal LM1, a second part PART2 overlapping with a part of the second lower metal LM2, and a third part PART3 between the first part PART1 and the second part PART2, and a second buffer layer BUF2 disposed on the overlapping pattern OP and disposed below the first active layer ACT1 and the second active layer ACT2.

A distance between the first source electrode S1 and the second source electrode S2 can be closer (smaller) than the distance between a first emission area EA1 formed by the first pixel electrode PE1 and a second emission area EA2 formed by the second pixel electrode PE2.

The display device 100 according to embodiments of the present disclosure can further include a gate insulating layer GI disposed on the first active layer ACT1 and the second active layer ACT2.

The first source electrode S1 can be disposed on the gate insulating layer GI, and can be connected to the first lower metal LM1 through a hole (GI Hole) in the gate insulating layer GI, the second buffer layer BUF2, and the first buffer layer BUF1.

The second source electrode S2 can be disposed on the gate insulating layer GI, and can be connected to the second lower metal LM2 through a hole (GI Hole) in the gate insulating layer GI, the second buffer layer BUF2, and the first buffer layer BUF1.

The display device 100 according to embodiments of the present disclosure can further include a passivation layer PAS disposed on a first source electrode S1, a first gate electrode G1, a second source electrode S2 and a second gate electrode G2, and an overcoat layer OC disposed on the passivation layer PAS.

The first pixel electrode PE1 can be disposed on the overcoat layer OC, and can be connected to the first source electrode S1 through a hole (OC Hole) in the overcoat layer OC and a hole (PAS Hole) in the passivation layer PAS. The second pixel electrode PE2 can be disposed on the overcoat layer OC, and can be connected to the second source electrode S2 through a hole (OC Hole) in the overcoat layer OC and a hole (PAS Hole) in the passivation layer PAS.

The first source electrode S1 and the second source electrode S2 can include the same electrode material (also called gate electrode material or gate metal) included in the first gate electrode G1 and the second gate electrode G2, and can be disposed in the same layer as the first gate electrode G1 and the second gate electrode G2.

The first gate electrode G1 can be disposed on the first active layer ACT1, and the second gate electrode G2 can be disposed on the second active layer ACT2.

Referring to FIGS. 15 to 18, the display device 100 according to embodiments of the present disclosure can further include a first storage capacitor Cst1 formed between the first source electrode S1 and the first gate electrode G1, and a second storage capacitor Cst2 formed between the second source electrode S2 and the second gate electrode G2.

The first storage capacitor Cst1 can include a first upper capacitor Cu1 and a first lower capacitor Cd1.

The first upper capacitor Cu1 can include a first capacitor electrode corresponding to the first source electrode S1 and a second capacitor electrode AP_SCT1 including the same material (e.g., active layer pattern) as the first active layer ACT1.

The first lower capacitor Cd1 can include a third capacitor electrode PLT including the same material as the overlapping pattern OP and a fourth capacitor electrode corresponding to the first lower metal LM1.

The first capacitor electrode and the fourth capacitor electrode can be at the same potential as the first source electrode S1, and the second capacitor electrode and the third capacitor electrode can be at the same potential as the first gate electrode G1.

Accordingly, the first upper capacitor Cu1 and the first lower capacitor Cd1 can be connected in parallel. Accordingly, the capacitance of the first storage capacitor Cst1 can increase.

The second storage capacitor Cst2 can include a second upper capacitor Cu2 and a second lower capacitor Cd2.

The second upper capacitor Cu2 can include a fifth capacitor electrode corresponding to the second source electrode S2 and a sixth capacitor electrode AP_SCT2 including the same material (e.g., active layer pattern) as the second active layer ACT2.

The second lower capacitor Cd2 can include a seventh capacitor electrode PLT including the same material as the overlapping pattern OP and an eighth capacitor electrode corresponding to the second lower metal LM2.

The fifth capacitor electrode and the eighth capacitor electrode can be at the same potential as the second source electrode S2, and the sixth capacitor electrode and the seventh capacitor electrode can be at the same potential as the second gate electrode G2.

Accordingly, the second upper capacitor Cu2 and the second lower capacitor Cd2 can be connected in parallel. Accordingly, the capacitance of the second storage capacitor Cst2 can increase.

If it is identified during the process that the first subpixel SP1 and the second subpixel SP2 are normal subpixels, the repair processing is not performed during the process. In this case, in the first state of the display panel 110, the first current I1 can be supplied from the first driving transistor DRT1 to the first pixel electrode PE1, and the second current I2 can be supplied from the second driving transistor DRT2 to the second pixel electrode PE2.

In the first state, as shown in FIGS. 17 and 18, the first part PART1 of the overlapping pattern OP and the first lower metal LM1 can be spaced apart, and the second part PART2 of the overlapping pattern OP and the second lower metal LM2 can be spaced apart.

Additionally, in the first state, as shown in FIG. 15, the overlapping pattern OP can be electrically connected to a common power line. For example, the common power line can include one or more of a driving voltage line DVL, a reference voltage line RVL, and a base voltage line BVL.

As shown in FIG. 15, for example, in the first state, the driving voltage line DVL can be a common power line for transmitting the driving voltage EVDD to the first drain electrode D1 and the second drain electrode D2, and can be connected to at least one of both ends of the overlapping pattern OP.

The repair structure for the third subpixel circuit SPC3 and the fourth subpixel circuit SPC4 can include a third lower metal LM3 connected to a source electrode of the third driving transistor DRT3 in the third subpixel circuit SPC3, a fourth lower metal LM4 connected to a source electrode of the fourth driving transistor DRT4 in the fourth subpixel circuit SPC4, and an overlapping pattern OP overlapping with at least a portion of the third lower metal LM3 and overlapping with at least a portion of the fourth lower metal LM4. Here, the overlapping pattern OP can include a first part PART1 overlapping with at least a part of the third lower metal LM3, a second part PART2 overlapping with at least a part of the fourth lower metal LM4, and a third part PART3 between the first part PART1 and the second part PART2.

In addition, in the first state in which the third subpixel SP3 and the fourth subpixel SP4 are identified as normal subpixels, and the third subpixel SP3 and the fourth subpixel SP4 are in a non-repaired state, as shown in FIG. 15, at least one of both ends of the overlapping pattern OP can be connected to the reference voltage line RVL, which is the most adjacent common power line.

If it is identified during the process that the first subpixel SP1 is a normal subpixel and the second subpixel SP is a defective subpixel, there can be performed the repair processing to normalize the second subpixel SP2 (i.e., a repair processing for causing the second light emitting device ED2 to emit light) during the process. In this case, in the second state of the display panel 110, the first current I1 can be supplied from the first driving transistor DRT1 to the first pixel electrode PE1 and the second pixel electrode PE2.

As shown in FIGS. 11 and 18, in the second state, the first part PART1 of the overlapping pattern OP and the first lower metal LM1 can be connected, and the second part PART2 of the overlapping pattern OP and the second lower metal LM2 can be connected. Accordingly, a first welding pattern WPTN1 can be formed between the first part PART1 of the overlapping pattern OP and the first lower metal LM1, and a second welding pattern WPTN2 can be formed between the second part PART2 of the overlapping pattern OP the second lower metal LM2.

In addition, as shown in FIG. 19, in the second state, the overlapping pattern OP can be electrically disconnected from the common power line. For example, the common power line can include one or more of a driving voltage line DVL, a reference voltage line RVL, and a base voltage line BVL.

For example, the overlapping pattern OP can be connected to the driving voltage line DVL, and then can be cut during the repair processing (i.e., first cutting).

As shown in FIG. 19, in the second state, the display device can further include a driving voltage line DVL for transferring the driving voltage EVDD to the first drain electrode D1 and the second drain electrode D2. In addition, both ends of the overlapping pattern OP can be electrically disconnected from the driving voltage line DVL.

Meanwhile, in the second state in which it is identified that the fourth subpixel SP4 among the third subpixel SP3 and the fourth subpixel SP4 is a defective subpixel, and the repair processing has been performed to normalize the fourth subpixel SP4, the connection between at least one of both ends of the overlapping pattern OP and the reference voltage line RVL can be disconnected by a cutting processing.

In addition, as shown in FIG. 19, in the second state, in order to disable the second driving transistor DRT2, for example, a connection point between the second driving transistor DRT2 and the driving voltage line DVL can be cut off (i.e., second cutting).

As described above, the repair structure described with reference to FIGS. 15 to 19 can require two welding processes (i.e., welding processes at two welding points WP1 and WP2) and two cutting processes (i.e., first cutting and second cutting).

Figure 20:
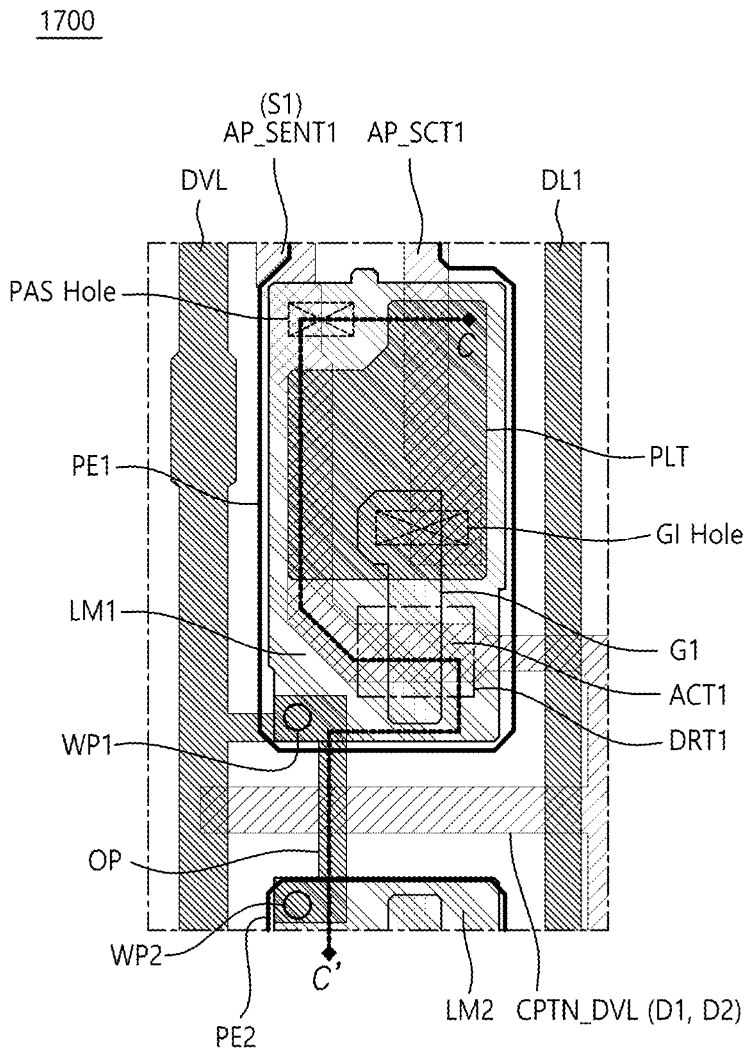
FIG. 20 is an enlarged plan view of a portion of FIG. 15.
Figure 21:
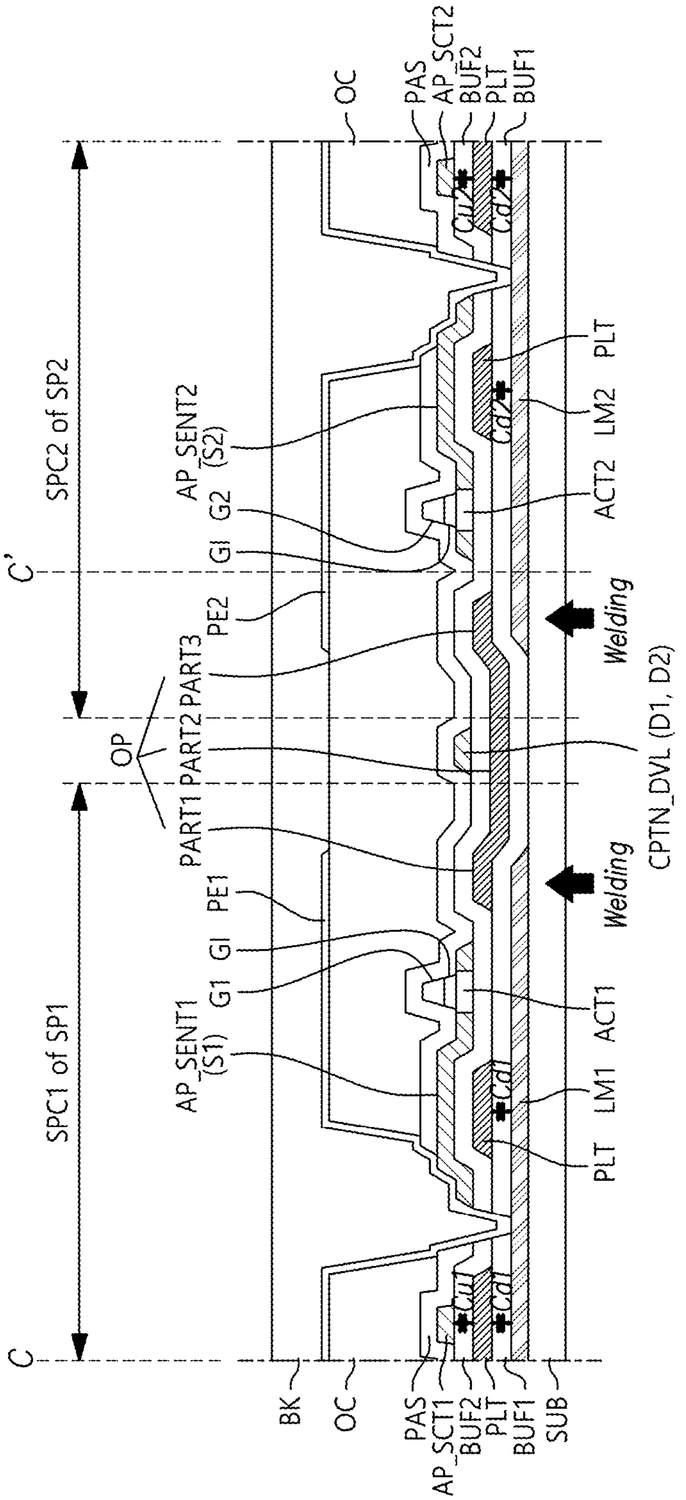
FIG. 21 is a cross-sectional view of first and second subpixels adjacent to each other in the column direction in a display device according to embodiments of the present disclosure.

FIG. 20 is an enlarged plan view of a partial area 1700 of FIG. 15. FIG. 21 is a cross-sectional view of first and second subpixels adjacent to each other in the column direction in a display device according to embodiments of the present disclosure. The cross-sectional view of FIG. 21 can include a portion along line C-C" of FIG. 20.

The plan view of FIG. 20 and the plan view of FIG. 16 are plan views illustrating the same partial area 1700 of FIG. 15 enlarged in more detail. Accordingly, the plan view of FIG. 20 can be almost identical to the plan view of FIG. 16. In addition, the cross-sectional view of FIG. 21 and the cross-sectional view of FIG. 18 are cross-sectional views of the same area. Accordingly, the cross-sectional view of FIG. 21 and the cross-sectional view of FIG. 18 can also almost correspond to each other. However, FIGS. 20 and 21 have only a few differences compared to FIGS. 16 and 18. Therefore, hereinafter, description of the same configuration will be omitted and the differences will be mainly explained.

The position of a hole (PAS Hole) in the passivation layer PAS in FIGS. 20 and 21 can be different from the position of the hole (PAS Hole) in the passivation layer PAS in FIGS. 16 and 18, and the position of a hole (GI Hole) in the gate insulating layer GI in FIGS. 20 and 21 can be different from the position of a hole (GI Hole) in the gate insulating layer GI in FIGS. 16 and 18.

This difference can be due to that the first and second source electrodes S1 and S2 of FIGS. 16 and 18 do not exist in FIGS. 20 and 21.

In FIGS. 16 and 18, the first pixel electrode PE1 and the first lower metal LM1 can be not directly connected but can be electrically connected through the first source electrode S1, and the second pixel electrode PE2 and the second lower metal LM2 may not be directly connected but can be electrically connected through the second source electrode S2.

In comparison, in FIGS. 20 and 21, the first pixel electrode PE1 can be directly connected to the first lower metal LM1, and the second pixel electrode PE2 can be directly connected to the second lower metal LM2.

The first pixel electrode PE1 can be directly connected to the first lower metal LM1 through a hole penetrating all of the overcoat layer OC, passivation layer PAS, second buffer layer BUF2, and first buffer layer BUF1.

The second pixel electrode PE2 can be directly connected to the second lower metal LM2 through a hole penetrating all of the overcoat layer OC, passivation layer PAS, second buffer layer BUF2, and first buffer layer BUF1.

Referring to FIGS. 20 and 21, the hole penetrating all of the overcoat layer OC, the passivation layer PAS, the second buffer layer BUF2, and the first buffer layer BUF1 can include a hole (PAS Hole) in the passivation layer PAS.

In FIGS. 20 and 21, the active layer pattern AP_SENT1 for forming the active layer of the first sensing transistor SENT1 can serve as the first source electrode S1, and the first pixel electrode PE1 can also serve as the first source electrode S1.

In FIGS. 20 and 21, the active layer pattern AP_SENT2 for forming the active layer of the second sensing transistor SENT2 can serve as the second source electrode S2, and the second pixel electrode PE2 can also serve as the second source electrode S2.

Since the first source electrode S1 and the second source electrode S2 of FIGS. 16 and 18 do not exist in FIGS. 20 and 21, the storage capacitor structures in FIGS. 20 and 21 can be different.

Referring to FIG. 21, a first storage capacitor Cst1 can include a first upper capacitor Cu1 and a first lower capacitor Cd1.

The first upper capacitor Cu1 can include a first capacitor electrode AP_SCT1 including the same material (e.g., active layer pattern) as the first active layer ACT1, and a second capacitor electrode PLT including the same material as the overlapping pattern OP. Here, the first capacitor electrode AP_SCT1 including the same material (e.g., active layer pattern) as the first active layer ACT1 can be electrically connected to the first pixel electrode PE1. Accordingly, the first capacitor electrode AP_SCT1 can be considered as the first pixel electrode PE1.

The first lower capacitor Cd1 can include a second capacitor electrode PLT including the same material as the overlapping pattern OP and a third capacitor electrode corresponding to the first lower metal LM1.

The first capacitor electrode and the third capacitor electrode can be at the same potential as the first source electrode S1, and the second capacitor electrode can be at the same potential as the first gate electrode G1. Accordingly, the first upper capacitor Cu1 and the first lower capacitor Cd1 can be connected in parallel. Accordingly, the capacitance of the first storage capacitor Cst1 can increase.

Referring to FIG. 21, the second storage capacitor Cst2 can include a second upper capacitor Cu2 and a second lower capacitor Cd2.

The second upper capacitor Cu2 can include a fourth capacitor electrode AP_SCT2 including the same material (e.g., active layer pattern) as the second active layer ACT2, and a fifth capacitor electrode PLT including the same material as the overlapping pattern OP. Here, the fourth capacitor electrode AP_SCT2 including the same material (e.g., active layer pattern) as the second active layer ACT2 can be electrically connected to the second pixel electrode PE2. Accordingly, the fourth capacitor electrode AP_SCT2 can be considered as the second pixel electrode PE2.

The second lower capacitor Cd2 can include a fifth capacitor electrode PLT including the same material as the overlapping pattern OP and a sixth capacitor electrode corresponding to the second lower metal LM2.

The fourth capacitor electrode and the sixth capacitor electrode can be at the same potential as the second source electrode S2, and the fifth capacitor electrode can be at the same potential as the second gate electrode G2. Accordingly, the second upper capacitor Cu2 and the second lower capacitor Cd2 can be connected in parallel. Accordingly, the capacitance of the second storage capacitor Cst2 can increase.

Hereinafter, it will be described a repair structure capable of reducing two welding processes to one welding process and two cutting processes to one cutting process with reference to FIGS. 22 to 26.

Figure 22:
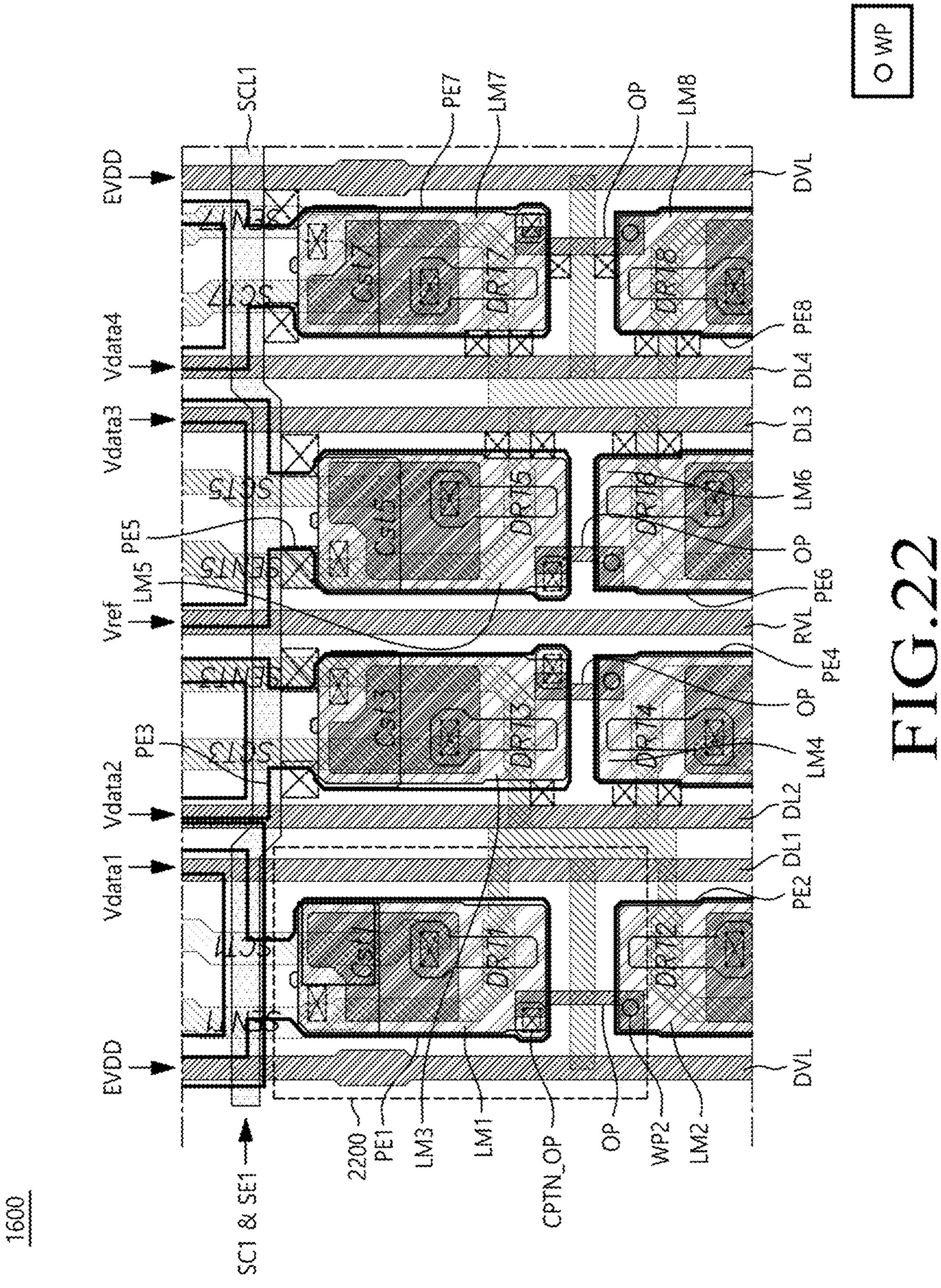
FIG. 22 is a plan view of a display panel according to embodiments of the present disclosure.
Figure 23:
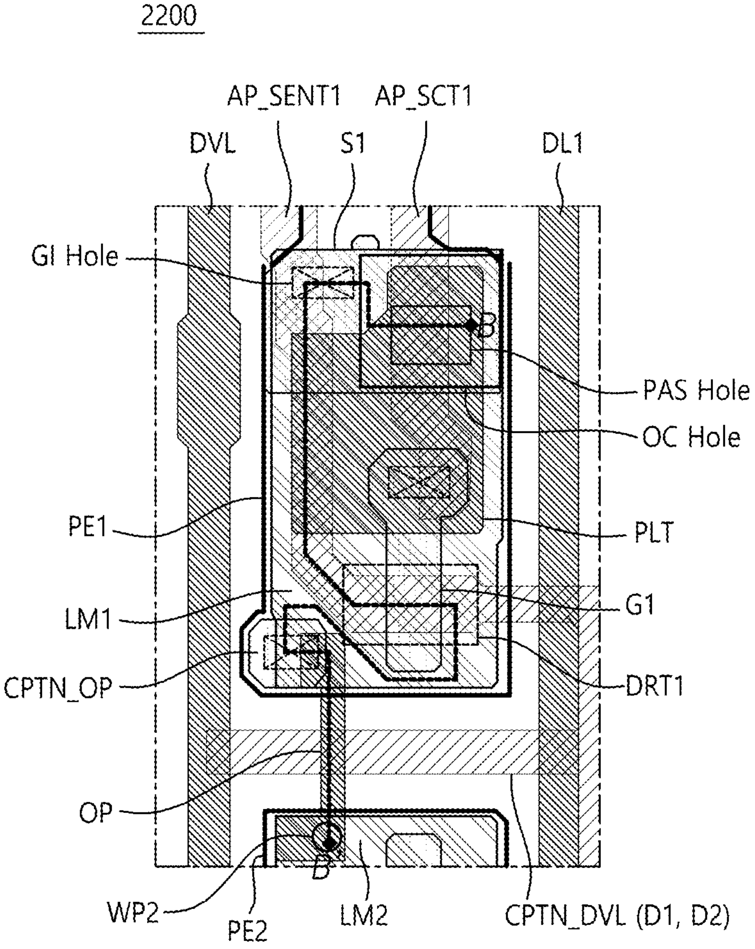
FIG. 23 is a plan view enlarging a portion of the area in FIG. 22.
Figure 24:
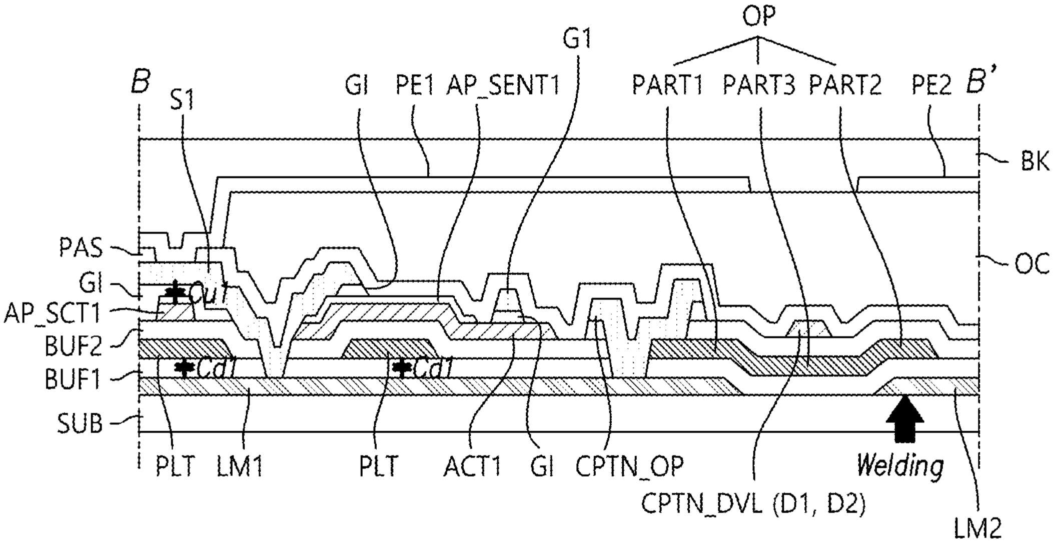
FIG. 24 is a cross-sectional view along line B-B' of FIG. 23.
Figure 25:
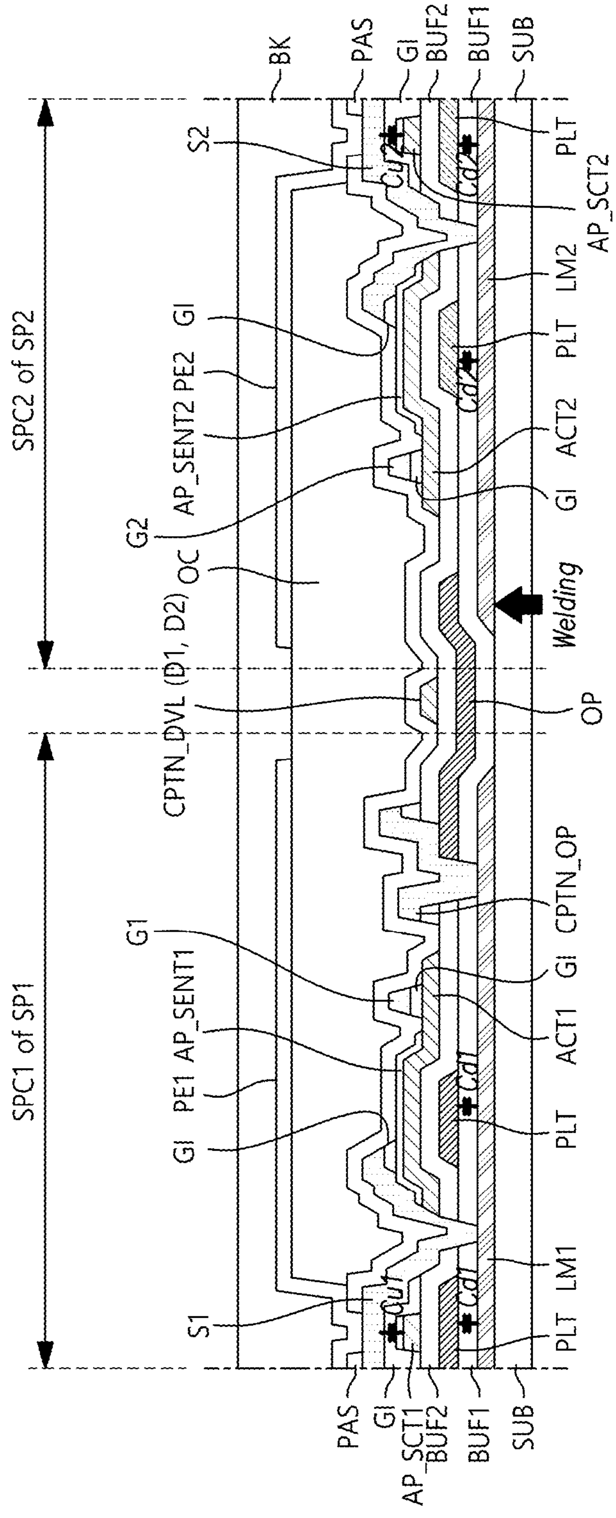
FIG. 25 is a cross-sectional view of first and second subpixels adjacent to each other in the column direction in a display device according to embodiments of the present disclosure.
Figure 26:
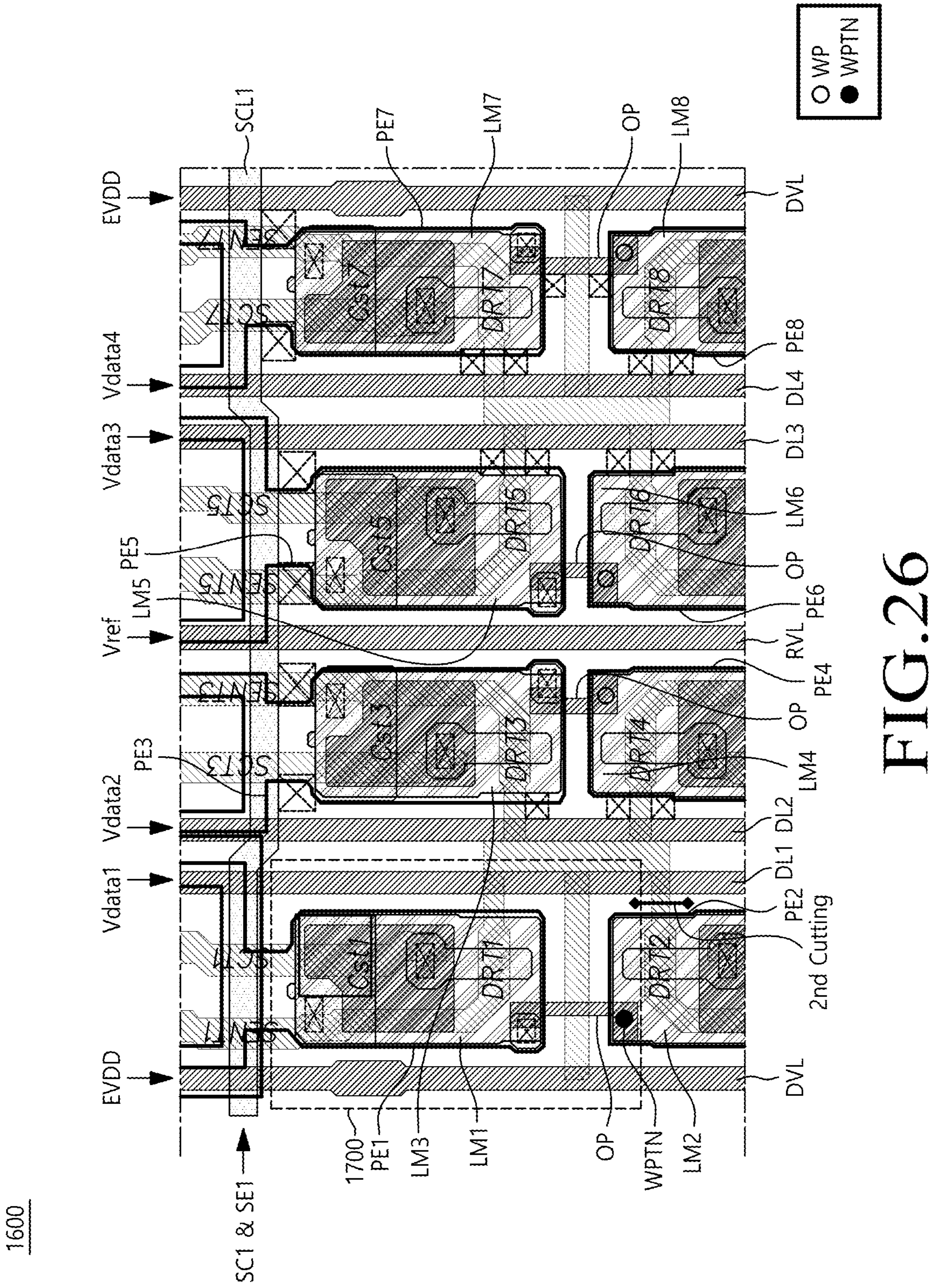
FIG. 26 is a plan view of a display panel on which repair processing has been performed.

FIG. 22 is a plan view for a partial area 1600 in FIG. 14, FIG. 23 is a plan view enlarging a partial area 2200 in FIG. 22, FIG. 24 is a cross-sectional view along line B-B' of FIG. 23, and FIG. 25 is a cross-sectional view of first and second subpixels SP1 and SP2 adjacent to each other in the column direction in a display device 100 according to embodiments of the present disclosure. FIG. 26 is a plan view for a partial area 1600 in FIG. 14, and a plan view of a display panel 110 on which repair processing has been performed.

FIGS. 22 to 26 can correspond to FIGS. 15 to 19 except a difference in the repair structure. Therefore, in describing with reference to FIGS. 22 to 26, the description of the same configuration as that of FIGS. 15 to 19 will be omitted, and the differences thereof will be mainly described.

Referring to FIGS. 22 to 26, before the repair processing, the second part PART2 of the overlapping pattern OP can be not electrically connected to the second lower metal LM2, but the first part PART1 of the overlapping pattern OP can be electrically connected to the first lower metal LM1 through a connection pattern CPTN_OP.

Meanwhile, before the repair process, the first part PART1 of the overlapping pattern OP can be not electrically connected to the first lower metal LM1, but the second part PART2 of the overlapping pattern OP can be electrically connected to the second lower metal LM2 through a connection pattern CPTN_OP.

For example, the repair structure according to embodiments of the present disclosure can further include a connection pattern CPTN_OP connecting the first part PART1 of the overlapping pattern OP and the first lower metal LM1 or connecting the second part PART2 of the overlapping pattern OP and the second lower metal LM2.

The connection pattern CPTN_OP can include the same material as the first source electrode S1 and the second source electrode S2, and can be disposed in a layer where the first source electrode S1 and the second source electrode S2 are disposed.

Before the repair processing, the overlapping pattern OP can be not connected to the adjacent common power line (e.g., driving voltage line (DVL), reference voltage line RVL).

If it was identified that a defect occurred in the second subpixel circuit SPC2 among the first subpixel circuit SPC1 and the second subpixel circuit SPC2, it is required only one welding process and one cutting process for performing the repair processing to normalize the second subpixel circuit SPC2.

The first welding process can be a welding process to electrically connect one end of the overlapping pattern OP to which the connection pattern CPTN_OP is not connected and the corresponding lower metal. For example, through one welding process, there can be formed a welding pattern WPTN between one end of the overlapping pattern OP to which the connection pattern CPTN_OP is not connected and the corresponding lower metal.

For example, the second part PART2 of the overlapping pattern OP can be electrically connected to the second lower metal LM2 through one welding process. For example, through one welding process, the welding pattern WPTN can be formed between the second part PART2 of the overlapping pattern OP and the second lower metal LM2.

The first cutting process can be a cutting process (e.g., second cutting) to disable the second subpixel circuit SPC2. For example, as shown in FIG. 26, the connection between the second driving transistor DRT2 and the driving voltage line DVL in the second subpixel circuit SPC2 can be disconnected through one cutting process.

Figure 27:
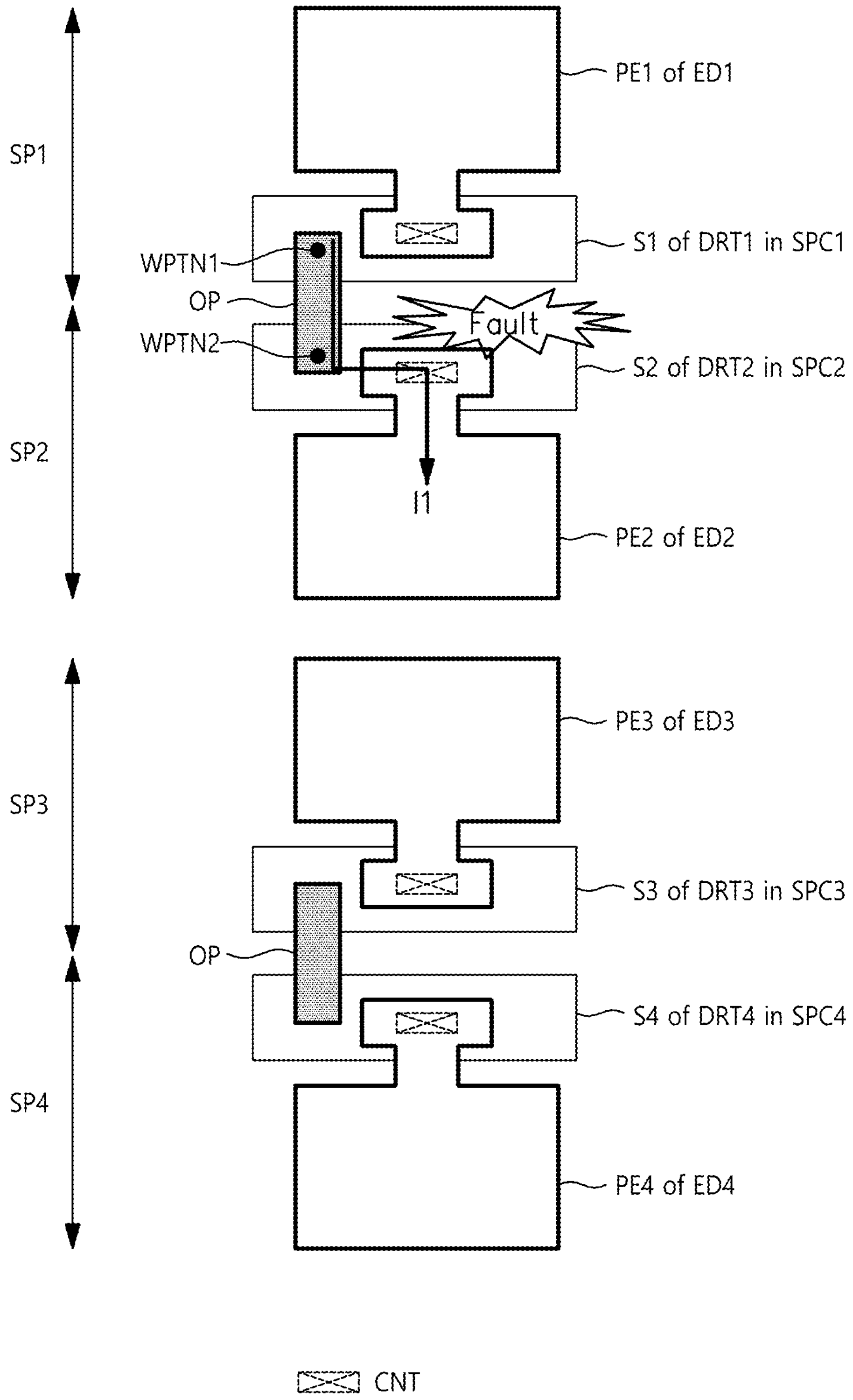
FIG. 27 illustrates a current supply situation after repair processing when a defect occurs in a second subpixel among the first to fourth subpixels arranged in the column direction in a display panel according to embodiments of the present disclosure.
Figure 28:
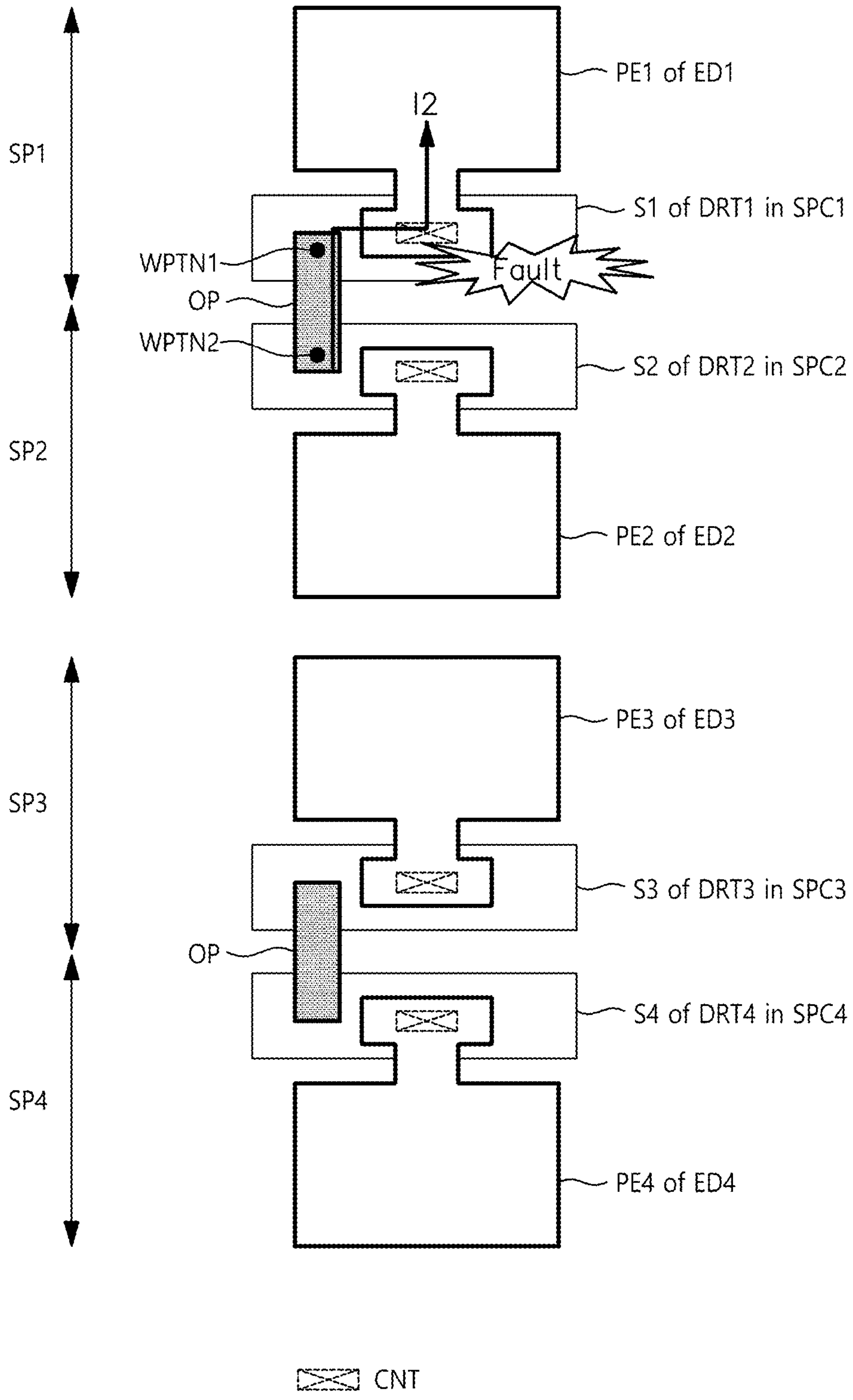
FIG. 28 illustrates a current supply situation after repair processing when a defect occurs in a first subpixel among first to fourth subpixels arranged in a column direction in a display panel according to embodiments of the present disclosure.

FIG. 27 illustrates a current supply situation after repair processing when a defect occurs in a second subpixel SP2 among the first to fourth subpixels arranged in the column direction in a display panel 110 according to embodiments of the present disclosure. FIG. 28 illustrates a current supply situation after repair processing when a defect occurs in a first subpixel SP1 among first to fourth subpixels arranged in a column direction in a display panel 110 according to embodiments of the present disclosure.

Referring to FIGS. 27 and 28, there is exemplified an example where the first to fourth subpixels SP1 to SP4 are disposed in a column direction.

The first subpixel SP1 can include a first pixel electrode PE1 of a first light emitting device ED1 and a first source electrode S1 of a first driving transistor DRT1 in a first subpixel circuit SPC1. The second subpixel SP2 can include a second pixel electrode PE2 of a second light emitting device ED2 and a second source electrode S2 of a second driving transistor DRT2 in a second subpixel circuit SPC2. The third subpixel SP3 can include a third pixel electrode PE3 of a third light emitting device ED3 and a third source electrode S3 of a third driving transistor DRT3 in a third subpixel circuit SPC3. The fourth subpixel SP4 can include a fourth pixel electrode PE4 of a fourth light emitting device ED4 and a fourth source electrode S4 of a fourth driving transistor DRT4 in a fourth subpixel circuit SPC4.

The first to fourth pixel electrodes PE1 to PE4 can be electrically connected to the first to fourth source electrodes S1 to S4 through the contact holes CNT in an insulating layer (e.g., overcoat layer OC, passivation layer PAS).

Referring to FIGS. 27 and 28, the first subpixel SP1 and the second subpixel SP2 can have a vertically symmetrical structure and can be a set for the repair processing, and the third subpixel SP3 and the fourth subpixel SP4 can have a vertically symmetrical structure and can be a set for the repair processing.

According to the vertically symmetrical structure of the first subpixel SP1 and the second subpixel SP2, the first subpixel circuit SPC1 and the second subpixel circuit SPC2 can be disposed adjacently to each other. According to the vertically symmetrical structure of the third subpixel SP3 and the fourth subpixel SP4, the third subpixel circuit SPC3 and the fourth subpixel circuit SPC4 can be disposed adjacent to each other. According to this vertically symmetrical structure, the second light emitting device ED2 and the third light emitting device ED3 can be disposed adjacent to each other.

The repair structure for the first and second subpixels SP1 and SP2 can include a first lower metal connected to the first source electrode S1, a second lower metal connected to a second source electrode S2, and an overlapping pattern OP overlapping with at least a portion of the first lower metal and overlapping with at least a portion of the second lower metal.

The repair structure for the third and fourth subpixels SP3 and SP4 can include a third lower metal connected to the third source electrode S3, a fourth lower metal connected to the fourth source electrode S4, and an overlapping pattern OP overlapping with at least a portion of the third lower metal and overlapping with at least a portion of the fourth lower metal.

Referring to FIG. 27, if a defect occurs in the second subpixel circuit SPC2, the first lower metal connected to the first source electrode S1 and the second lower metal connected to the second source electrode S2 can be connected to the overlapping pattern OP through the repair processing to normalize the second subpixel SP2. Accordingly, a first welding pattern WPTN1 can be formed between the overlapping pattern OP and the first lower metal, and a second welding pattern WPTN2 can be formed between the overlapping pattern OP and the second lower metal.

In addition, the second subpixel circuit SPC2 can be disabled through the repair processing to normalize the second subpixel SP2.

Referring to FIG. 27, through the repair process to normalize the second subpixel SP2, the first current I1 output from the first source electrode S1 of the first driving transistor DRT1 in the normal first subpixel circuit SPC1 can be supplied to the first pixel electrode PE1 as well as the second pixel electrode PE2. Accordingly, the second light emitting device ED2 can emit light normally.

Referring to FIG. 28, if a defect occurs in the first subpixel circuit SPC1, the first lower metal connected to the first source electrode S1 and the second lower metal connected to the second source electrode S2 can be connected to the overlapping pattern OP through the repair processing to normalize the first subpixel SP1. Accordingly, a first welding pattern WPTN1 can be formed between the overlapping pattern OP and the first lower metal, and a second welding pattern WPTN2 can be formed between the overlapping pattern OP and the second lower metal.

In addition, the first subpixel circuit SPC1 can be disabled through the repair processing to normalize the first subpixel SP1.

Referring to FIG. 28, through the repair process to normalize the first subpixel SP1, the second current I2 output from the second source electrode S2 of the second driving transistor DRT2 in the normal second subpixel circuit SPC2 can be supplied to the second pixel electrode PE2 as well as the first pixel electrode PE1. Accordingly, the first light emitting device ED1 can emit light normally.

Embodiments of the present disclosure described above are briefly described as follows.

A display device according to embodiments of the present disclosure can include a first lower metal directly connected to a first pixel electrode or a first source electrode in a first subpixel and overlapping a first active layer, a second lower metal directly connected to a second pixel electrode or a second source electrode in a second sub-pixel and overlapping a second active layer, and an overlapping pattern, wherein one side of the overlapping pattern overlaps with at least a portion of the first lower metal and the other side of the overlapping pattern overlaps with at least a portion of the second lower metal.

A display device according to embodiments of the present disclosure can include a first driving transistor including a first active layer, a first drain electrode, and a first gate electrode, a first pixel electrode connected directly to a portion of the first active layer or electrically connected to a portion of the first active layer through an additional first source electrode, a second driving transistor including a second active layer, a second drain electrode, and a second gate electrode, a second pixel electrode connected directly to a portion of the second active layer or electrically connected to a portion of the second active layer through an additional second source electrode, a first lower metal directly connected to the first pixel electrode or directly connected to the first source electrode and overlapping with the first active layer, a second lower metal directly connected to the second pixel electrode or directly connected to the second source electrode and overlapping with the second active layer, a first buffer layer disposed on the first lower metal and the second lower metal, an overlapping pattern disposed on the first buffer layer and including a first part overlapping with at least a portion of the first lower metal, a second part overlapping with at least a portion of the second lower metal, and a third part between the first part and the second part, and a second buffer layer disposed on the overlapping pattern and disposed below the first active layer and the second active layer.

A distance between the first source electrode and the second source electrode can be smaller than a distance between a first emission area formed by the first pixel electrode and a second emission area formed by the second pixel electrode.

The display device according to embodiments of the present disclosure can further include a gate insulating layer disposed on the first active layer and the second active layer.

The first source electrode can be disposed on the gate insulating layer, and can be connected to the first lower metal through a hole in the gate insulating layer, the second buffer layer and the first buffer layer.

The second source electrode can be disposed on the gate insulating layer, and can be connected to the second lower metal through a hole in the gate insulating layer, the second buffer layer and the first buffer layer.

The display device according to embodiments of the present disclosure can further include a passivation layer disposed on the first source electrode, the first gate electrode, the second source electrode, and the second gate electrode, and an overcoat layer disposed on the passivation layer.

The first pixel electrode can be disposed on the overcoat layer, and can be connected to the first source electrode through a hole in the overcoat layer and the passivation layer. The second pixel electrode can be disposed on the overcoat layer, and can be connected to the second source electrode through a hole in the overcoat layer and the passivation layer.

The first gate electrode can be disposed on the first active layer, and the second gate electrode can be disposed on the second active layer.

The first source electrode and the second source electrode can include the same electrode material included in the first gate electrode and the second gate electrode.

The display device according to embodiments of the present disclosure can further include, as an example of a storage capacitor structure, a first storage capacitor formed between a first source electrode and a first gate electrode, and a second storage capacitor formed between a second source electrode and a second gate electrode.

The first storage capacitor can include a first upper capacitor and a first lower capacitor. The first upper capacitor and the first lower capacitor can be connected in parallel to form the first storage capacitor.

The second storage capacitor can include a second upper capacitor and a second lower capacitor. The second upper capacitor and the second lower capacitor can be connected in parallel to form the second storage capacitor.

The first upper capacitor can include a first capacitor electrode corresponding to the first source electrode and a second capacitor electrode including the same material as the first active layer.

The first lower capacitor can include a third capacitor electrode including the same material as the overlapping pattern and a fourth capacitor electrode corresponding to the first lower metal.

The second upper capacitor can include a fifth capacitor electrode corresponding to the second source electrode and a sixth capacitor electrode including the same material as the second active layer.

The second lower capacitor can include a seventh capacitor electrode including the same material as the overlapping pattern and an eighth capacitor electrode corresponding to the second lower metal.

The display device according to embodiments of the present disclosure can further include, as another example of a storage capacitor structure, a first storage capacitor formed between a first pixel electrode and a first gate electrode, and a second storage capacitor formed between a second pixel electrode and a second gate electrode.

The first storage capacitor can include a first upper capacitor and a first lower capacitor, and the second storage capacitor can include a second upper capacitor and a second lower capacitor.

The first upper capacitor and the first lower capacitor can be connected in parallel to form a first storage capacitor.

The first upper capacitor can include a first capacitor electrode including the same material as the first active layer, and a second capacitor electrode including the same material as the overlapping pattern.

The first lower capacitor can include a second capacitor electrode and the third capacitor electrode corresponding to the first lower metal.

The second upper capacitor and the second lower capacitor can be connected in parallel to form a second storage capacitor.

The second upper capacitor can include a fourth capacitor electrode including the same material as the second active layer, and a fifth capacitor electrode including the same material as the overlapping pattern.

The second lower capacitor can include a fifth capacitor electrode and a sixth capacitor electrode corresponding to the first lower metal.

When a first current is supplied from the first driving transistor to the first pixel electrode and a second current is supplied from the second driving transistor to the second pixel electrode (e.g., when it is identified that both the first and second subpixels are normal subpixels, and the repair processing is not performed), the first part and the first lower metal can be spaced apart or the second part and the second lower metal can be spaced apart.

When a first current is supplied from the first driving transistor to the first pixel electrode and a second current is supplied from the second driving transistor to the second pixel electrode, at least one of the first lower metal and the second lower metal can be electrically separated from the overlapping pattern.

The display device according to embodiments of the present disclosure can further include a connection pattern connecting the first part and the first lower metal or connecting the second part and the second lower metal. Here, the connection pattern can include the same material as the first source electrode and the second source electrode.

When a first current is supplied from the first driving transistor to the first pixel electrode and the second pixel electrode, the first part and the first lower metal can be connected, and the second part and the second lower metal can be connected.

The display device according to embodiments of the present disclosure can further include a driving voltage line for transmitting a driving voltage to the first drain electrode and the second drain electrode.

When a first current is supplied from the first driving transistor to the first pixel electrode and a second current is supplied from the second driving transistor to the second pixel electrode, at least one of both ends of the overlapping pattern can be connected to the driving voltage line.

When a first current is supplied from the first driving transistor to the first pixel electrode and the second pixel electrode (e.g., when it is identified that the first subpixel is a normal subpixel and the second subpixel is a defective subpixel, and the repair processing has been performed), both ends of the overlapping pattern can be electrically disconnected from the driving voltage line.

When a first current is supplied from the first driving transistor to the first pixel electrode and a second current is supplied from the second driving transistor to the second pixel electrode, the driving voltage line and the first drain electrode can be electrically connected, and the driving voltage line and the second drain electrode can be electrically connected.

When a first current is supplied from the first driving transistor to the first pixel electrode and the second pixel electrode, the driving voltage line and the first drain electrode can be electrically connected, and the driving voltage line and the second drain electrode can be electrically disconnected.

The display device according to embodiments of the present disclosure can further include a data line for transmitting a data voltage, a first scan transistor controlling a connection between the data line and the first gate electrode, and a second scan transistor controlling a connection between the data line and the second gate electrode.

When a first current is supplied from the first driving transistor to the first pixel electrode and a second current is supplied from the second driving transistor to the second pixel electrode, the data line and the first scan transistor can be connected, and the data line and the second scan transistor can be connected.

When a first current is supplied from the first driving transistor to the first pixel electrode and the second pixel electrode, the data line and the first scan transistor can be connected, and the data line and the second scan transistor can be disconnected.

The display device according to embodiments of the present disclosure can further include a reference voltage line for transmitting a reference voltage, a first sensing transistor controlling a connection between the reference voltage line and the first source electrode, and a second sensing transistor controlling a connection between the reference voltage line and the second source electrode.

When a first current is supplied from the first driving transistor to the first pixel electrode and a second current is supplied from the second driving transistor to the second pixel electrode, the reference voltage line and the first sensing transistor can be connected, and the reference voltage line and the second sensing transistor can be connected.

When a first current is supplied from the first driving transistor to the first pixel electrode and the second pixel electrode, the reference voltage line and the first sensing transistor can be connected, and the reference voltage line and the second sensing transistor can be disconnected.

A display device according to embodiments of the present disclosure can include a first subpixel including a first driving transistor and a first light emitting device, a second subpixel including a second driving transistor and a second light emitting device, a first lower metal connected to a first source electrode of the first driving transistor, a second lower metal connected to a second source electrode of the second driving transistor, an overlapping pattern including a first part overlapping with a portion of the first lower metal, a second part overlapping with a portion of the second lower metal, and a third part between the first part and the second part, and a first buffer layer disposed between the first lower metal and the second lower metal and the overlapping pattern.

The first lower metal can be disposed below a first active layer of the first driving transistor, the second lower metal can be disposed below a second active layer of the second driving transistor, and the overlapping pattern can be disposed below the first lower metal and the second lower metal.

When a first current is supplied from the first driving transistor to a first pixel electrode and the second current is supplied from the second driving transistor to a second pixel electrode, the first part and the first lower metal can be spaced apart, or the second part and the second lower metal can be spaced apart.

When the first current is supplied from the first driving transistor to the first pixel electrode and the second pixel electrode, the first part and the first lower metal can be connected, and the second part and the second lower metal can be connected.

A distance between the first source electrode and the second source electrode can be smaller than a distance between a first emission area of the first light emitting device and a second emission area of the second light emitting device.

When a first current is supplied from the first driving transistor to a first pixel electrode and a second current is supplied from the second driving transistor to a second pixel electrode, the overlapping pattern can be electrically connected to a common power line.

When the first current is supplied from the first driving transistor to the first pixel electrode and the second pixel electrode, the overlapping pattern can be electrically disconnected from the common power line.

A display panel according to embodiments of the present disclosure can include a first subpixel including a first subpixel circuit and a first light emitting device, a second subpixel including a second subpixel circuit and a second light emitting device, a first lower metal connected to the first subpixel circuit, a second lower metal connected to the second subpixel circuit, an overlapping pattern including a first part overlapping with a part of the first lower metal, a second part overlapping with a part of the second lower metal, and a third part between the first part and the second part, and a first buffer layer disposed between the first lower metal, the second lower metal, and the overlapping pattern.

When a first current is supplied from the first subpixel circuit to the first light emitting device and a second current is supplied from the second subpixel circuit to the second light emitting device, the first part and the first lower metal can be spaced apart, or the second part and the second lower metal can be spaced apart, When a first current is supplied from the first subpixel circuit to the first light emitting device and the second light emitting device, the first part and the first lower metal can be connected, and the second part and the second lower metal can be connected.

A distance between the first subpixel circuit and the second subpixel circuit is smaller than a distance between a first emission area of the first light emitting device and a second emission area of the second light emitting device.

The display panel according to embodiments of the present disclosure can further include a common power line adjacent to the overlapping pattern. For example, the common power line can include at least one of a driving voltage line, a reference voltage line, and a base voltage line. For example, the common power line can be a constant voltage line whose voltage level does not change with time.

When a first current is supplied from the first subpixel circuit to the first light emitting device and a second current is supplied from the second subpixel circuit to the second light emitting device, the overlapping pattern can be electrically connected to the common power line, When a first current is supplied from the first subpixel circuit to the first light emitting device and the second light emitting device, the overlapping pattern can be electrically disconnected from the common power line.

The display panel according to embodiments of the present disclosure can further include a substrate, a first active layer disposed in a first subpixel circuit, and a second active layer disposed in a second subpixel circuit.

The first lower metal can be disposed below the first active layer and overlap with the first active layer. The second lower metal can be disposed below the second active layer and overlap with the second active layer.

The overlapping pattern can be disposed in the metal layer between the first lower metal and the second lower metal, and the substrate.

According to embodiments of the present disclosure as described above, it is possible to provide a display device and a display panel having a repair structure capable of repairing a subpixel with a defect.

According to embodiments of the present disclosure, it is possible to provide a display device and a display panel having a repair structure which does not cause a decrease in aperture ratio.

According to embodiments of the present disclosure, it is possible to provide a display device and a display panel having a repair structure occupying a small space.

According to embodiments of the present disclosure, it is possible to a display device and a display panel having a repair structure suitable for high-resolution implementation.

According to embodiments of the present disclosure, it is possible to provide a display device and a display panel having a repair structure with high repair performance or high possibility of repair success, thereby optimizing the process by reducing production energy consumption.

The above description and the accompanying drawings provide an example of the technical idea of the present disclosure for illustrative purposes only. Various modifications, additions and substitutions to the described embodiments will be readily apparent to those skilled in the art without departing from the spirit and scope of the present disclosure. In addition, the disclosed embodiments are intended to illustrate the scope of the technical idea of the present disclosure. Thus, the scope of the present disclosure is not limited to the embodiments shown.

What is claimed is:

1. A display device comprising:

a first driving transistor including a first active layer, a first drain electrode, and a first gate electrode;

a first pixel electrode connected directly to a portion of the first active layer or electrically connected to a portion of the first active layer through an additional first source electrode;

a second driving transistor including a second active layer, a second drain electrode, and a second gate electrode;

a second pixel electrode connected directly to a portion of the second active layer or electrically connected to a portion of the second active layer through an additional second source electrode;

a first lower metal directly connected to the first pixel electrode or directly connected to the first source electrode, and overlapping with the first active layer;

a second lower metal directly connected to the second pixel electrode or directly connected to the second source electrode, and overlapping with the second active layer;

a first buffer layer disposed on the first lower metal and the second lower metal;

an overlapping pattern disposed on the first buffer layer, and including a first part overlapping with at least a portion of the first lower metal, a second part overlapping with at least a portion of the second lower metal, and a third part between the first part and the second part; and a second buffer layer disposed on an upper surface of the overlapping pattern in an area where the second buffer layer overlaps with the overlapping pattern in a vertical direction from the first buffer layer toward the first active layer and the second active layer, and disposed below the first active layer and the second active layer in the vertical direction.

2. The display device of claim 1, wherein a distance between the first source electrode and the second source electrode is smaller than a distance between a first emission area formed by the first pixel electrode and a second emission area formed by the second pixel electrode.

3. The display device of claim 1, further comprising a gate insulating layer disposed on the first active layer and the second active layer, wherein the first source electrode is disposed on the gate insulating layer, and is connected to the first lower metal through a hole in the gate insulating layer, the second buffer layer and the first buffer layer, and wherein the second source electrode is disposed on the gate insulating layer, and is connected to the second lower metal through a hole in the gate insulating layer, the second buffer layer and the first buffer layer.

4. The display device of claim 1, further comprising:

a passivation layer disposed on the first source electrode, the first gate electrode, the second source electrode, and the second gate electrode; and an overcoat layer disposed on the passivation layer, wherein the first pixel electrode is disposed on the overcoat layer, and is connected to the first source electrode through a hole in the overcoat layer and the passivation layer, and wherein the second pixel electrode is disposed on the overcoat layer, and is connected to the second source electrode through a hole in the overcoat layer and the passivation layer.

5. The display device of claim 1, wherein the first gate electrode is disposed on the first active layer, and the second gate electrode is disposed on the second active layer, and wherein the first source electrode and the second source electrode include a same electrode material included in the first gate electrode and the second gate electrode.

6. The display device of claim 1, further comprising:

a first upper capacitor including a first capacitor electrode corresponding to the first source electrode and a second capacitor electrode including a same material as the first active layer;

a first lower capacitor including a third capacitor electrode including a same material as the overlapping pattern and a fourth capacitor electrode corresponding to the first lower metal;

a second upper capacitor including a fifth capacitor electrode corresponding to the second source electrode and a sixth capacitor electrode including a same material as the second active layer; and a second lower capacitor including a seventh capacitor electrode including the same material as the overlapping pattern and an eighth capacitor electrode corresponding to the second lower metal, wherein the first upper capacitor and the first lower capacitor are connected in parallel to form a first storage capacitor, and wherein the second upper capacitor and the second lower capacitor are connected in parallel to form a second storage capacitor.

7. The display device of claim 1, further comprising:

a first upper capacitor including a first capacitor electrode including a same material as the first active layer, and a second capacitor electrode including the same material as the overlapping pattern;

a first lower capacitor including the second capacitor electrode and a third capacitor electrode corresponding to the first lower metal;

a second upper capacitor including a fourth capacitor electrode including a same material as the second active layer, and a fifth capacitor electrode including the same material as the overlapping pattern; and a second lower capacitor including the fifth capacitor electrode and a sixth capacitor electrode corresponding to the first lower metal, wherein the first upper capacitor and the first lower capacitor are connected in parallel to form a first storage capacitor, and wherein the second upper capacitor and the second lower capacitor are connected in parallel to form a second storage capacitor.

8. The display device of claim 1, wherein, when a first current is supplied from the first driving transistor to the first pixel electrode and a second current is supplied from the second driving transistor to the second pixel electrode, the first part and the first lower metal are spaced apart or the second part and the second lower metal are spaced apart, and at least one of the first lower metal and the second lower metal is electrically separated from the overlapping pattern.

9. The display device of claim 8, further comprising a connection pattern connecting the first part and the first lower metal or connecting the second part and the second lower metal, wherein the connection pattern includes a same material as the first source electrode and the second source electrode.

10. The display device of claim 1, wherein, when a first current is supplied from the first driving transistor to the first pixel electrode and the second pixel electrode, the first part and the first lower metal are connected, and the second part and the second lower metal are connected.

11. The display device of claim 1, further comprising a driving voltage line configured to transmit a driving voltage to the first drain electrode and the second drain electrode, wherein, when a first current is supplied from the first driving transistor to the first pixel electrode and a second current is supplied from the second driving transistor to the second pixel electrode, at least one of ends of the overlapping pattern is connected to the driving voltage line.

12. The display device of claim 1, further comprising a driving voltage line configured to transmit a driving voltage to the first drain electrode and the second drain electrode, wherein, when a first current is supplied from the first driving transistor to the first pixel electrode and the second pixel electrode, ends of the overlapping pattern are electrically disconnected from the driving voltage line.

13. The display device of claim 1, further comprising a driving voltage line configured to transmit a driving voltage to the first drain electrode and the second drain electrode, wherein, when a first current is supplied from the first driving transistor to the first pixel electrode and a second current is supplied from the second driving transistor to the second pixel electrode, the driving voltage line and the first drain electrode are electrically connected, and the driving voltage line and the second drain electrode are electrically connected, and wherein, when a first current is supplied from the first driving transistor to the first pixel electrode and the second pixel electrode, the driving voltage line and the first drain electrode are electrically connected, and the driving voltage line and the second drain electrode are electrically disconnected.

14. The display device of claim 1, further comprising:

a data line configured to transmit a data voltage;

a first scan transistor configured to control a connection between the data line and the first gate electrode; and a second scan transistor configured to control a connection between the data line and the second gate electrode, wherein, when a first current is supplied from the first driving transistor to the first pixel electrode and a second current is supplied from the second driving transistor to the second pixel electrode, the data line and the first scan transistor are connected, and the data line and the second scan transistor are connected, and wherein, when a first current is supplied from the first driving transistor to the first pixel electrode and the second pixel electrode, the data line and the first scan transistor are connected, and the data line and the second scan transistor are disconnected.

15. The display device of claim 1, further comprising:

a reference voltage line configured to transmit a reference voltage;

a first sensing transistor configured to control a connection between the reference voltage line and the first source electrode; and a second sensing transistor configured to control a connection between the reference voltage line and the second source electrode, wherein, when a first current is supplied from the first driving transistor to the first pixel electrode and a second current is supplied from the second driving transistor to the second pixel electrode, the reference voltage line and the first sensing transistor are connected, and the reference voltage line and the second sensing transistor are connected, and wherein, when a first current is supplied from the first driving transistor to the first pixel electrode and the second pixel electrode, the reference voltage line and the first sensing transistor are connected, and the reference voltage line and the second sensing transistor are disconnected.

16. A display panel comprising:

a first subpixel including a first subpixel circuit and a first light emitting device;

a first active layer disposed within the first subpixel circuit;

a second subpixel including a second subpixel circuit and a second light emitting device;

a second active layer disposed within the second subpixel circuit;

a first lower metal connected to the first subpixel circuit;

a second lower metal connected to the second subpixel circuit;

an overlapping pattern including a first part overlapping with a part of the first lower metal, a second part overlapping with a part of the second lower metal, and a third part between the first part and the second part;

a first buffer layer disposed between the first lower metal, the second lower metal, and the overlapping pattern; and a second buffer layer disposed on an upper surface of the overlapping pattern in an area where the second buffer layer overlaps with the overlapping pattern in a vertical direction from the first buffer layer toward the first active layer and the second active layer, and disposed below the first active layer and the second active layer in the vertical direction.

17. The display panel of claim 16, further comprising:

a substrate, wherein the first lower metal is disposed below the first active layer and overlaps with the first active layer, wherein the second lower metal is disposed below the second active layer and overlaps with the second active layer, and wherein the overlapping pattern is disposed in a metal layer between the first lower metal and the second lower metal and the substrate.

18. The display panel of claim 16, wherein a distance between the first subpixel circuit and the second subpixel circuit is smaller than a distance between a first emission area of the first light emitting device and a second emission area of the second light emitting device.

19. The display panel of claim 16, wherein, when a first current is supplied from the first subpixel circuit to the first light emitting device and a second current is supplied from the second subpixel circuit to the second light emitting device, the first part and the first lower metal are spaced apart, or the second part and the second lower metal are spaced apart, and wherein, when a first current is supplied from the first subpixel circuit to the first light emitting device and the second light emitting device, the first part and the first lower metal are connected, and the second part and the second lower metal are connected.

20. The display panel of claim 16, further comprising a common power line adjacent to the overlapping pattern, wherein, when a first current is supplied from the first subpixel circuit to the first light emitting device and a second current is supplied from the second subpixel circuit to the second light emitting device, the overlapping pattern is electrically connected to the common power line, wherein, when a first current is supplied from the first subpixel circuit to the first light emitting device and the second light emitting device, the overlapping pattern is electrically disconnected from the common power line.

* * * * *